INVENTORS
HENRY G. HENRICKSON
CORNELIS LANGEWIS
A. DEAN SMITH

ATTORNEY

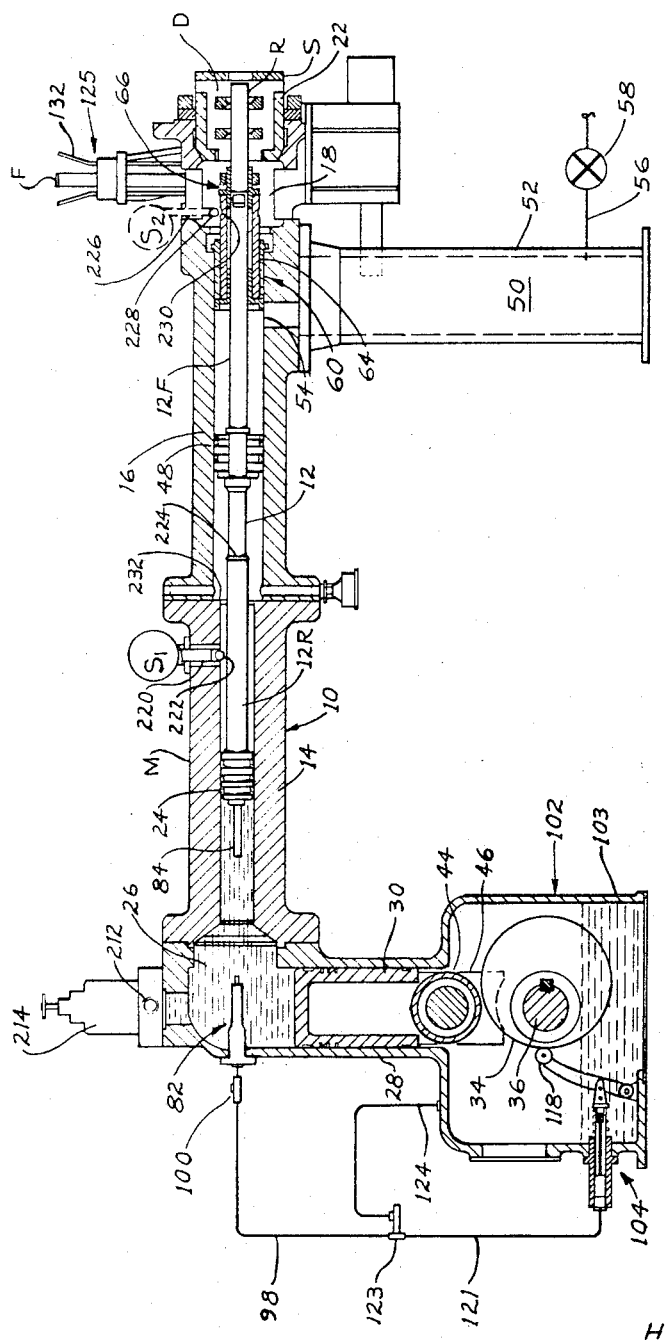

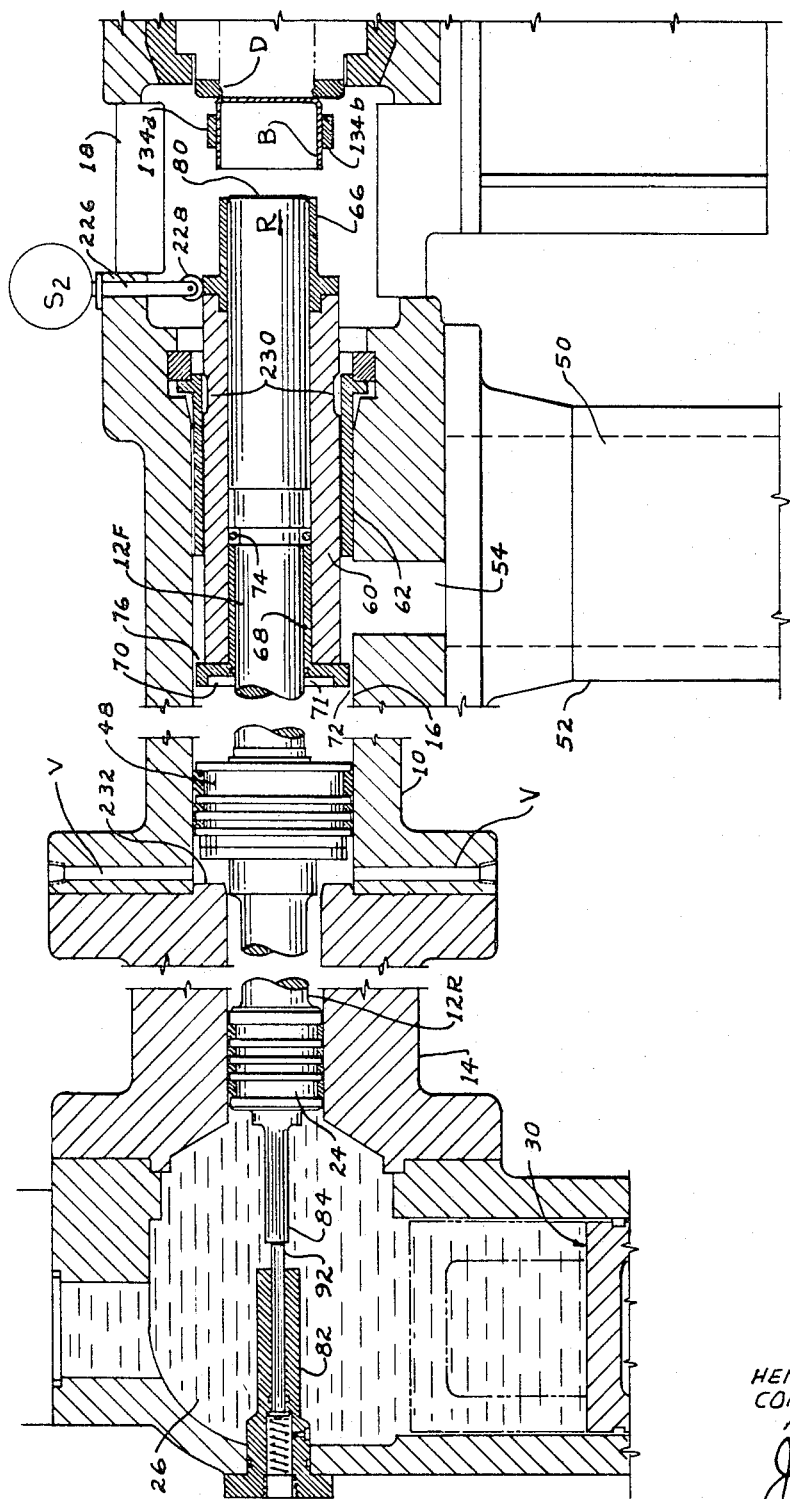

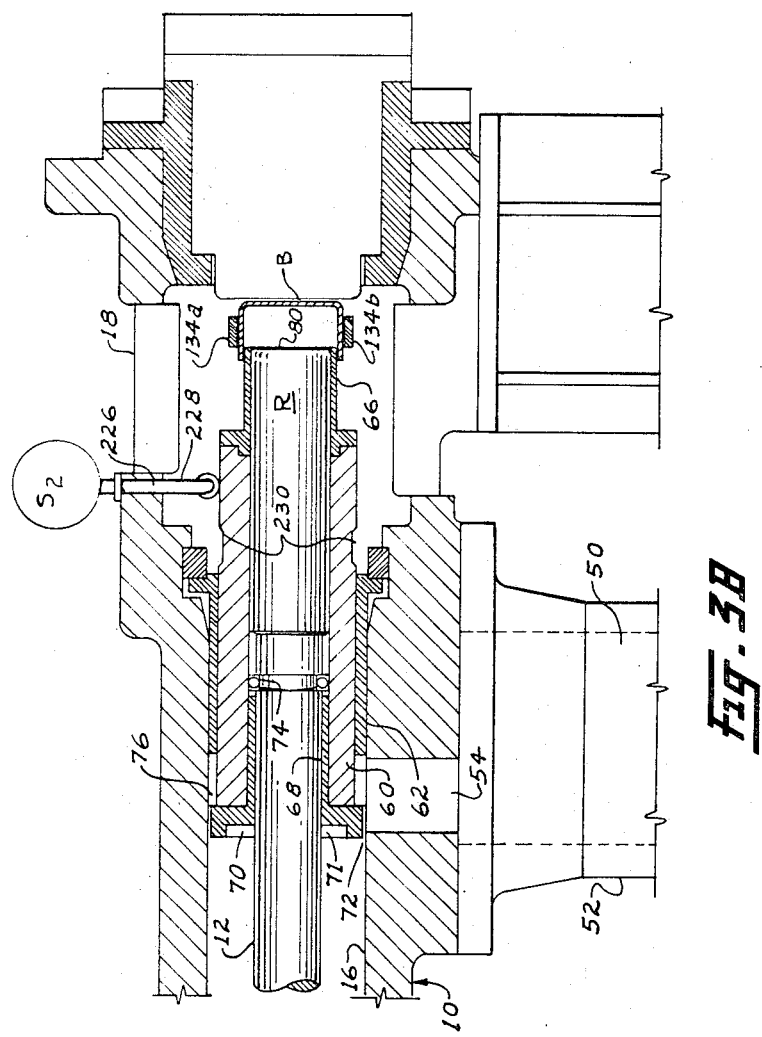

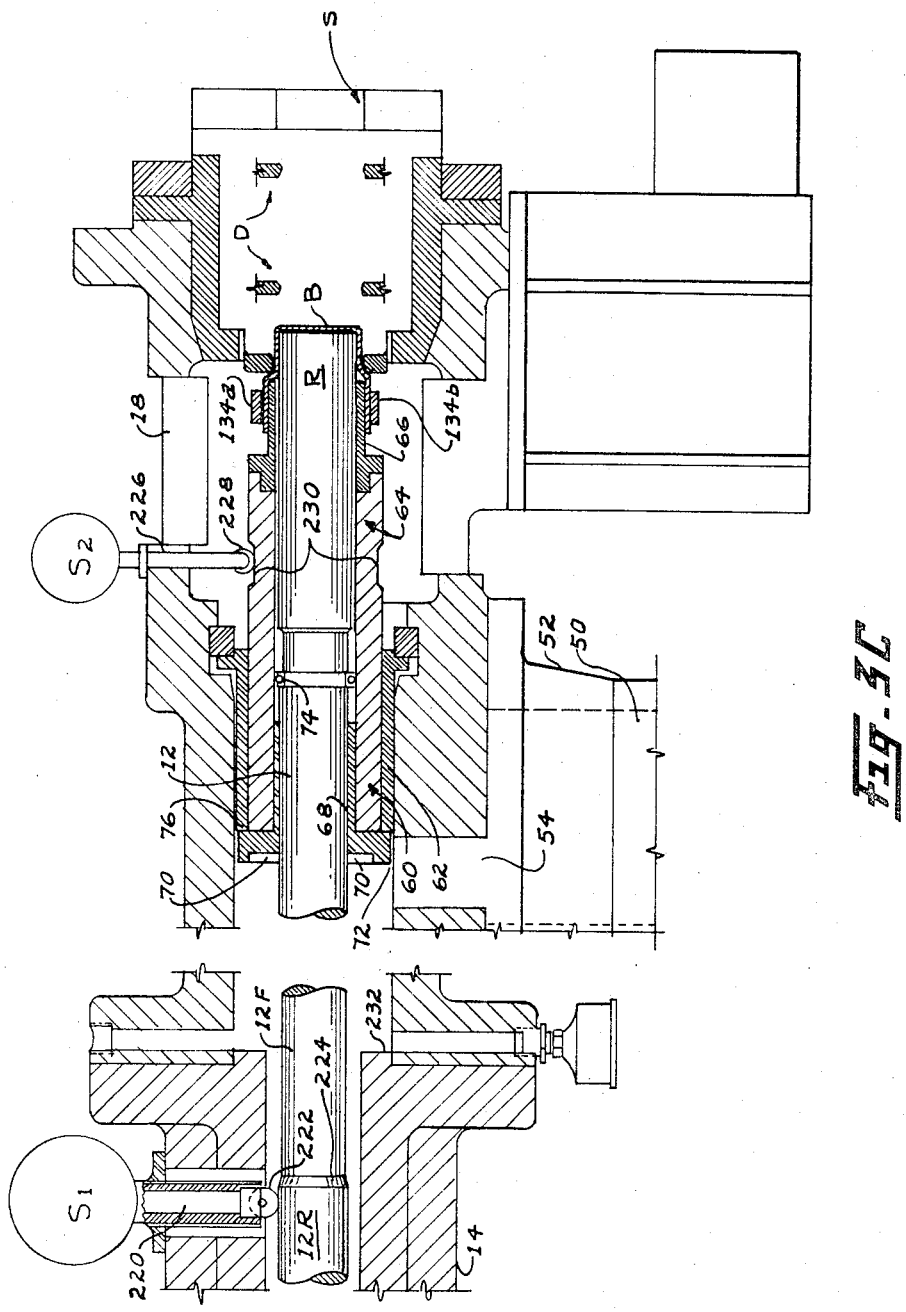

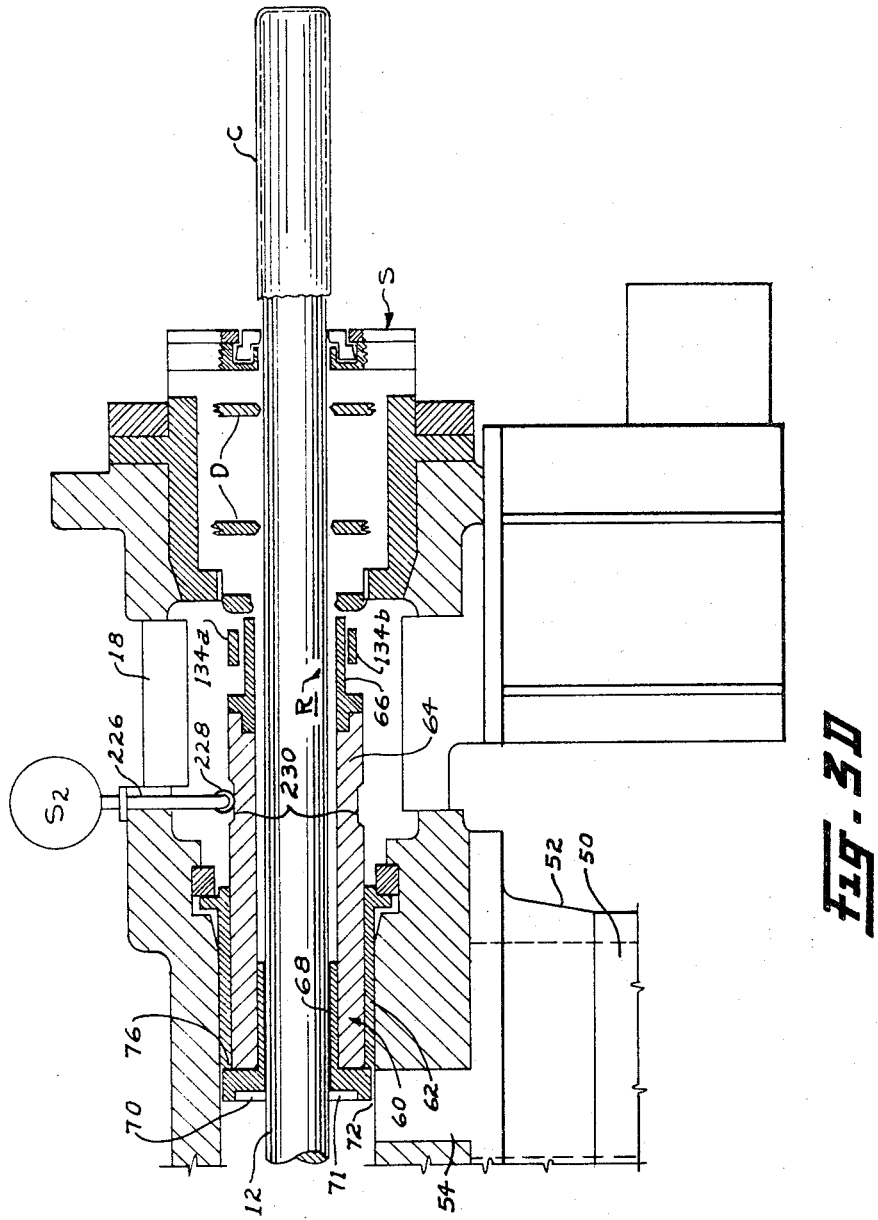

April 23, 1968 ARTHUR DEAN SMITH 3,379,153
ALSO KNOWN AS A. DEAN SMITH ETAL
FEED MECHANISM FOR CUP-SHAPED BLANKS
Original Filed April 29, 1963 18 Sheets-Sheet 8
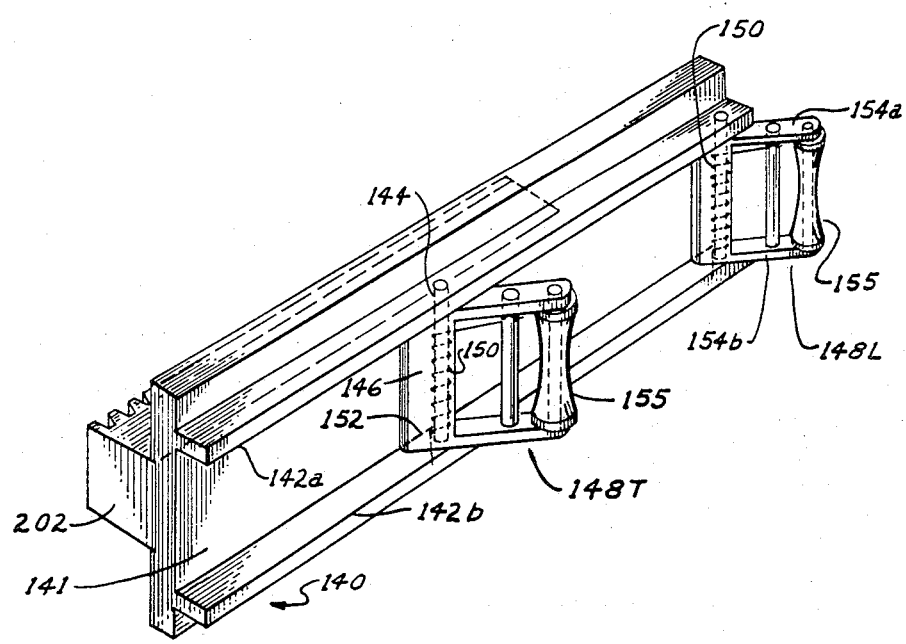
_Fig.12_
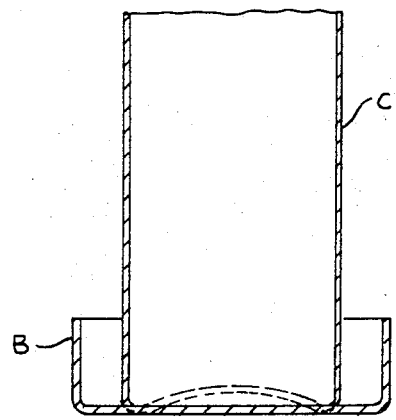
_Fig.6_
INVENTORS
HENRY G. HENRICKSON
CORNELIS LANGEWIS
A. DEAN SMITH
ATTORNEY

INVENTORS
HENRY G. HENRICKSON
CORNELIS LANGEWIS
A. DEAN SMITH

James E. Cooney
ATTORNEY

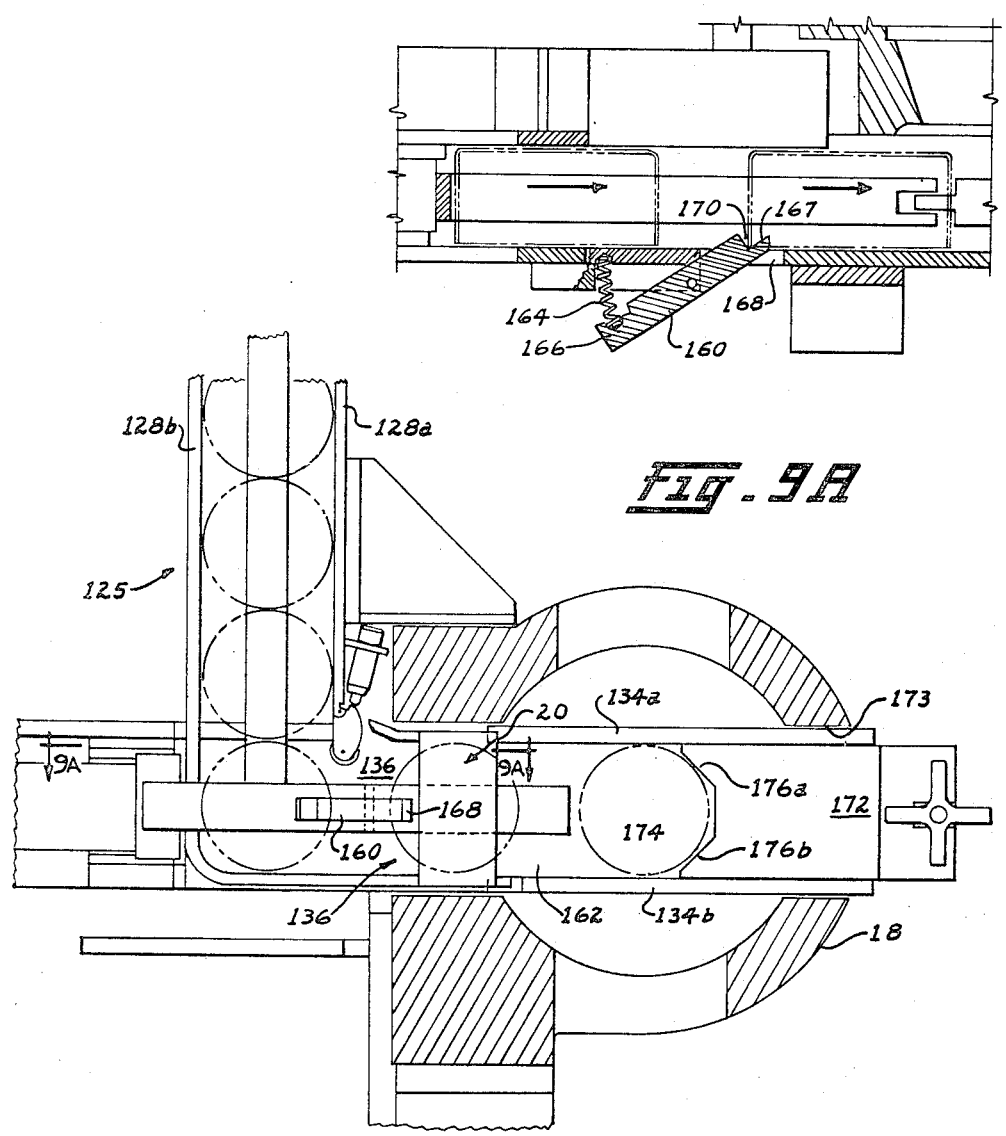

April 23, 1968    ARTHUR DEAN SMITH    3,379,153
ALSO KNOWN AS A. DEAN SMITH ETAL
FEED MECHANISM FOR CUP-SHAPED BLANKS
Original Filed April 29, 1963                18 Sheets-Sheet 12

INVENTORS
HENRY G. HENRICKSON
CORNELIS LANGEWIS
A. DEAN SMITH

James E. Cooney
ATTORNEY

April 23, 1968 ARTHUR DEAN SMITH 3,379,153
ALSO KNOWN AS A. DEAN SMITH ETAL
FEED MECHANISM FOR CUP-SHAPED BLANKS
Original Filed April 29, 1963 18 Sheets-Sheet 15

INVENTORS
HENRY G. HENRICKSON
CORNELIS LANGEWIS
A. DEAN SMITH
ATTORNEY

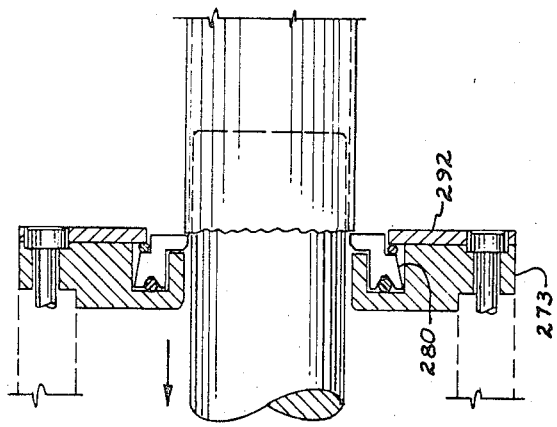
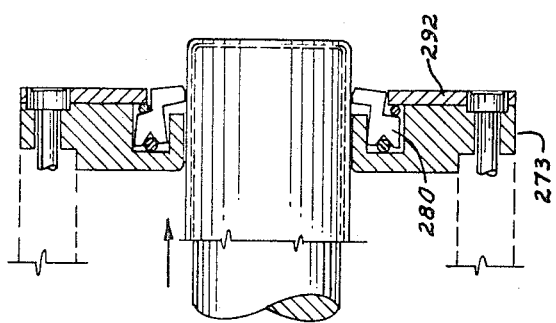
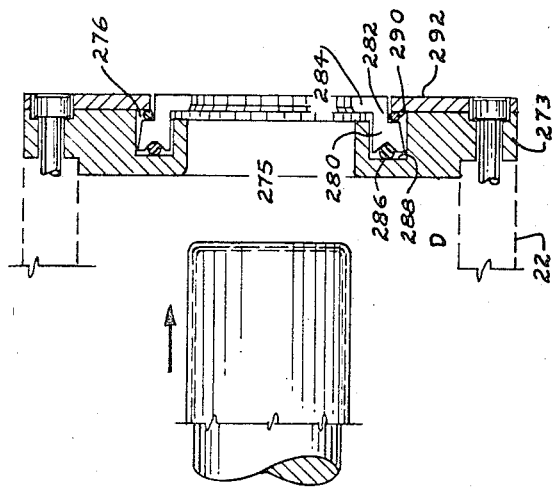

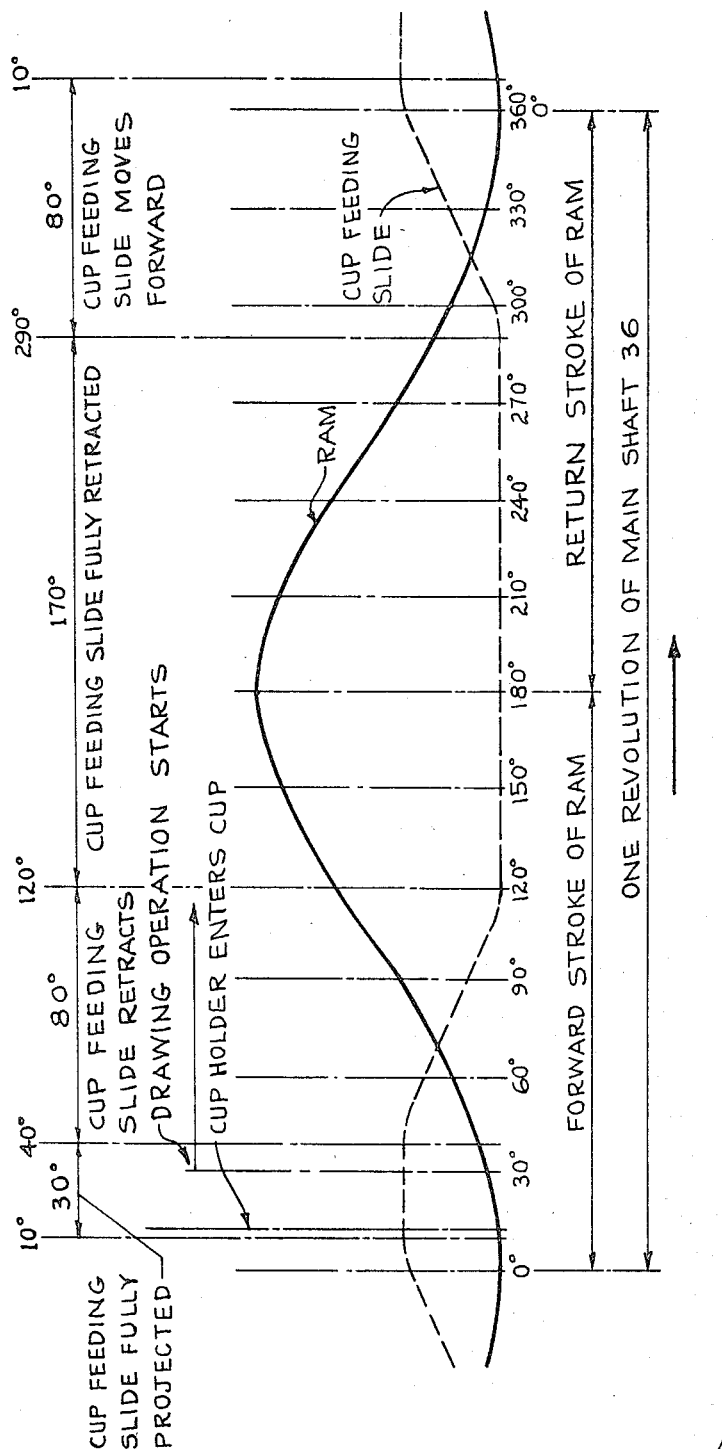

3,379,153
FEED MECHANISM FOR CUP-SHAPED BLANKS
Arthur Dean Smith, also known as A. Dean Smith, San Lorenzo, Henry G. Henrickson, Walnut Creek, and Cornelis Langewis, Oakland, Calif., assignors to Kaiser Aluminum & Chemical Corporation, Oakland, Calif., a corporation of Delaware
Original application Apr. 29, 1963, Ser. No. 276,632. Divided and this application July 8, 1966, Ser. No. 590,112
3 Claims. (Cl. 113—115)

This application is a divisional of Ser. No. 276,632 filed Apr. 29, 1963.

The present invention relates to machines for forming cup-shaped metal containers, and particularly elongated cup-shaped metal containers, such as the cans used in the food preservation industry.

It is the purpose of this invention to provide an improved machine for forming cup-shaped metal containers, such as elongated cup-shaped metal containers, from starting blanks or workpieces which may have the form of shallow sheet metal cups or flat blanks and also to provide improved apparatus for feeding the blanks to said machine and for stripping the finished containers from the forming ram of the machine.

Other purposes and objects of this invention will become apparent from the following specification taken with the drawings which together describe and illustrate a preferred embodiment of the machine and apparatus for carrying out the invention. Other embodiments of the invention may suggest themselves to those having the benefit of the teachings disclosed herein and such other embodiments are intended to be reserved especially as they fall within the scope of the subjoined claims.

In the drawings:

FIG. 2 is a central vertical section through the machine taken along line 2—2 of FIG. 1 and viewed in the direction of the arrows associated with said line;

FIGS. 3A, 3B, 3C and 3D are fragmentary vertical sections illustrating various parts of the machine shown in FIG. 2 in different operational positions;

FIG. 6 is a cross section of a blank such as may be delivered to the machine of the invention, and superimposed thereon a cross section of the container formed by the machine;

FIG. 9 is a fragmentary section through the blank-feeding apparatus and the blank-receiving station of the machine generally taken along line 9—9 of FIG. 1 and viewed in the direction of the arrows associated with said line;

FIG. 9A is a detail of a portion of the blank-feeding apparatus when viewed in the direction of the arrows 9A—9A shown in FIG. 9;

FIG. 12 is a perspective of a component of the blank-feeding mechanism;

FIG. 16A is a section through the mechanism of FIG. 15 taken along line 16—16 of FIG. 15;

FIG. 16B is a section similar to FIG. 16A illustrating the position of the stripping mechanism as the forming ram of the machine pushes a container therethrough;

FIG. 16C is another section similar to FIGS. 16A and 16B illustrating the position of the stripping mechanism during the actual container-stripping phase of its performance;

FIG. 19 is a phase diagram illustrating the operation of the container-forming machine and the blank-feeding apparatus as controlled by the cams shown in FIG. 18.

*General organization of the machine*

The machine of the instant invention generally comprises a ram or punch R and a mechanism M for reciprocating said ram to drive, during its forward stroke, a cup-shaped blank B (FIG. 6) through a sequence of dies D (FIG. 2). The machine of the invention also comprises a blank feeding apparatus F that delivers the cup-shaped blanks in their proper position into the space between the retracted ram and the first of the dies, and a mechanism S at the end of the last die for stripping the completed container bodies or receptacles without injury, from the ram at the beginning of the return stroke thereof.

*The ram and the mechanism for reciprocating the ram*

Figure 8B:
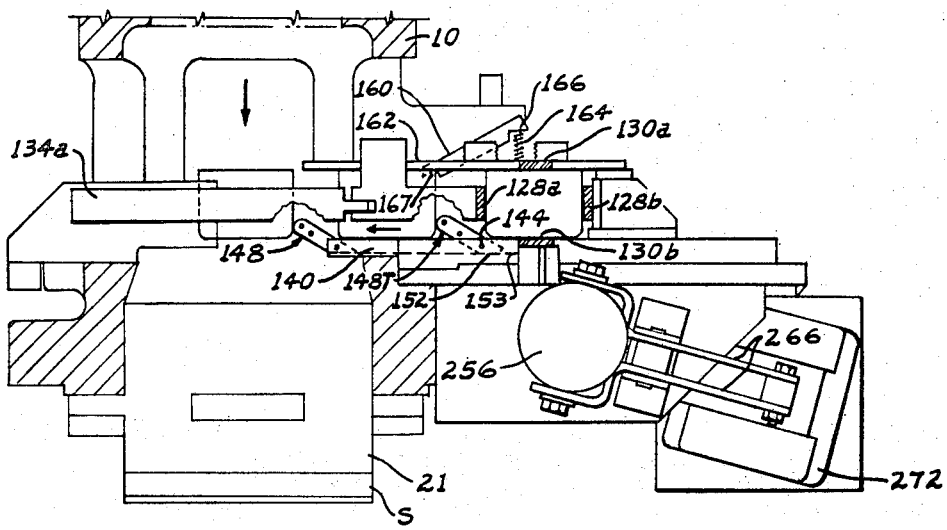
FIG. 8B is a plan view similar to FIG. 8A illustrating a different position of the blank-feeding mechanism.
Figure 8A:
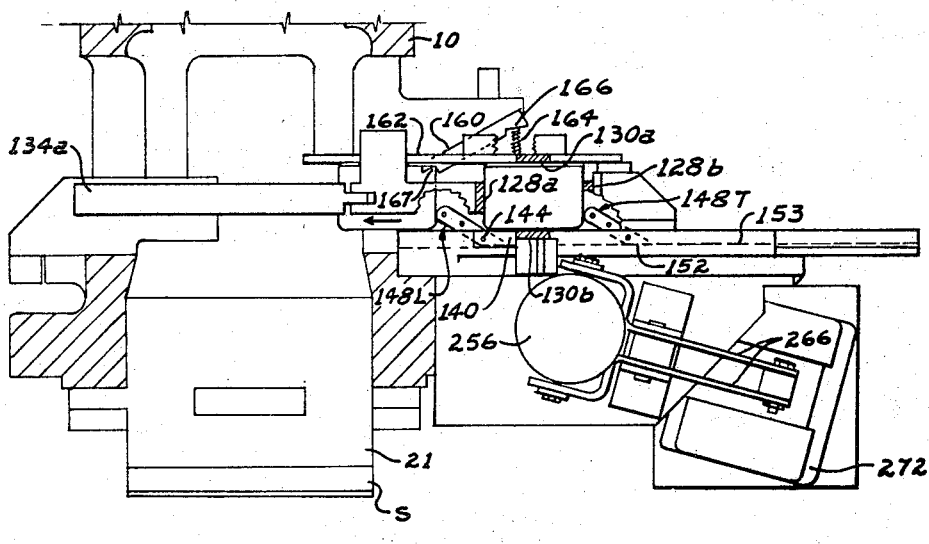
FIG. 8A is a plan view of a horizontal section through the blank-feeding mechanism of the apparatus of the instant invention.

The mechanism for reciprocating the ram comprises a barrel or housing 10 within which is operated a piston rod 12 whose forward end or extremity carries the ram. This barrel has a first portion 14 of a relatively small internal diameter, a second portion 16 of a somewhat larger internal diameter which is suitably joined to said first portion, and a radially extended third portion 18 which constitutes the blank-receiving station and which has a lateral aperture 20 (FIG. 9) through which the feeding apparatus F delivers the blanks in timed relation with the advance of the ram and into a position wherein they may be properly acted upon by the ram (FIGS. 8A, 8B). The barrel 10 also comprises a terminal portion 21 which contains a tubular housing 22 for the reception of suitable dies D through which the ram draws the blanks B (FIG. 6) to form them into container C of predetermined length, diameter and wall thickness.

Figure 14:
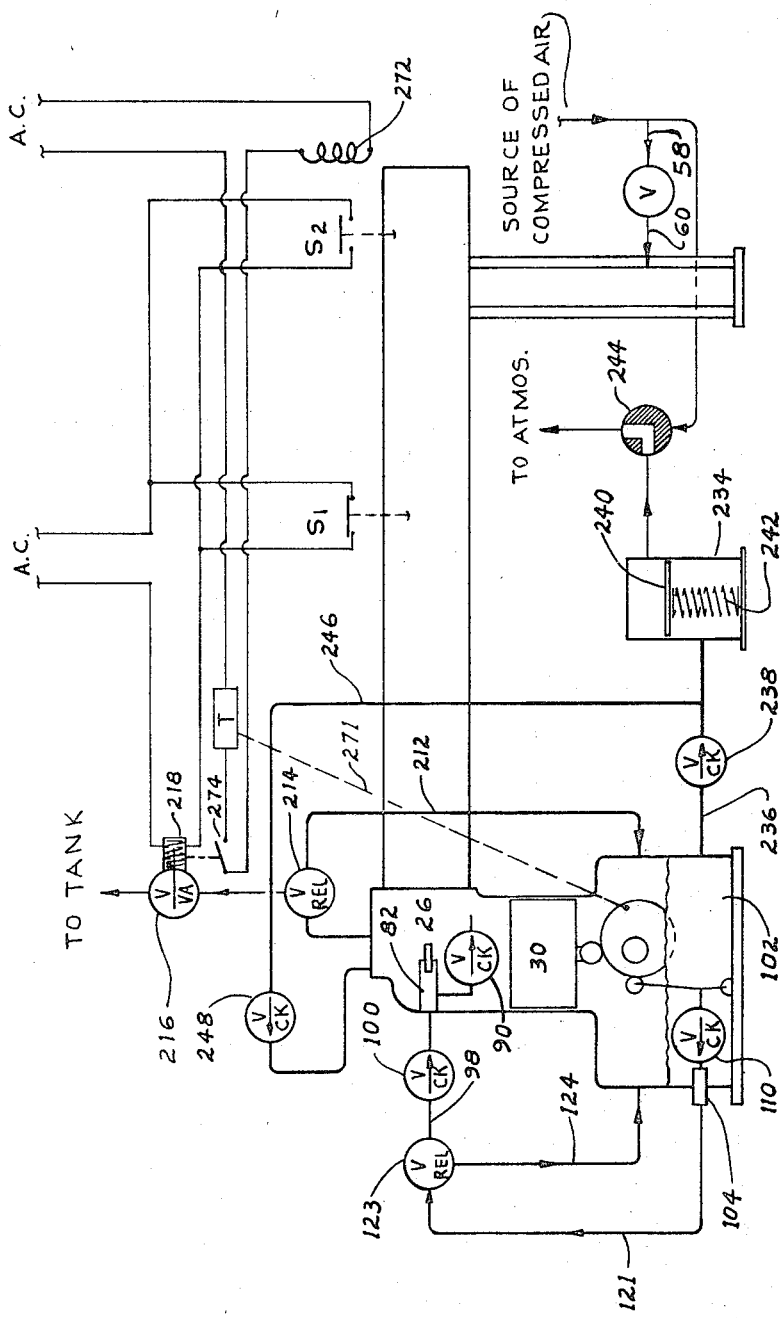
FIG. 14 is an exemplary diagram of the electric circuitry and of the hydraulic and pneumatic lines used to operate various parts of the machine of the invention.
Figure 18:
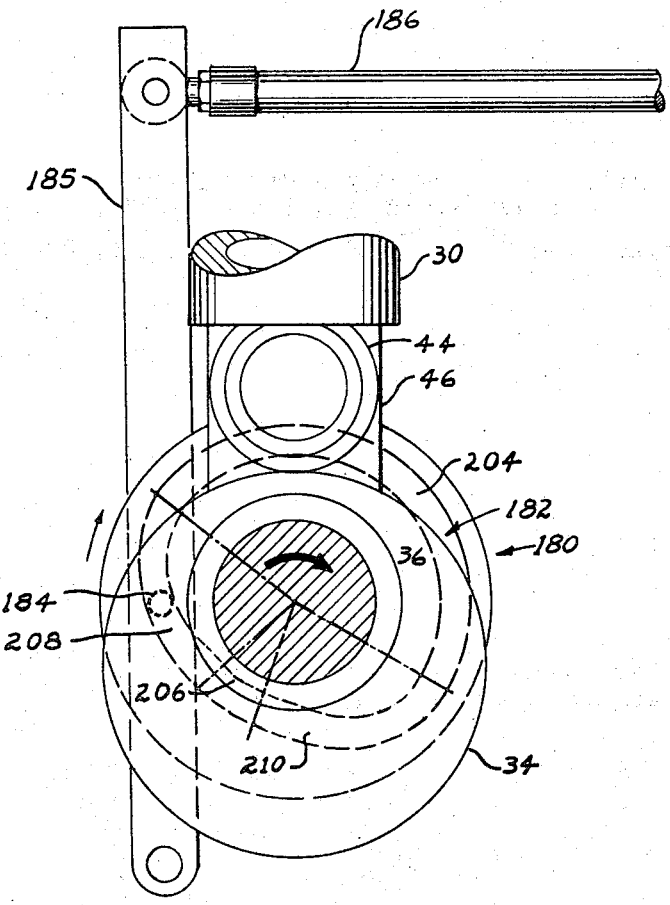
FIG. 18 illustrates the relative positions of the cams which control the operation of the container-forming machine and the blank-feeding apparatus therefor.

For reciprocating the piston rod 12 and hence the ram at high speeds while maintaining precise axial alignment with the barrel 10 so as to produce containers having substantially uniform wall thicknesses, the rod 12 carries within the first portion 14 of the barrel a piston 24. The open end of said first barrel portion communicates directly with a closed reservoir 26 that is filled with liquid. The reservoir 26 is formed or located at the upper end or first portion of a vertically disposed cylindrical column or enclosure 28 preferably of a substantially larger diameter than the diameter of the adjacent end of the barrel. Within the cylindrical or second portion of the enclosure a piston 30 is slidably received. During operation of the machine piston 30 is continually reciprocated between predetermined levels by a circular cam disk 34 that is eccentrically counted upon a horizontally disposed shaft 36. Shaft 36 is supported in a third portion of the enclosure below and transversely to the axis of the barrel and is driven from a motor 38 through a train of pulleys and belts collectively identified by the reference numeral 40 (FIGS. 1 and 2) and a suitable reduction transmission represented by the housing 42. The edge of the eccentric 34 engages a roller 44 that is pivoted to the stem 46 of the piston 30. Hence, whenever the motor 38 is set into motion and turns the shaft 36, the rotating eccentric 34 raises and releases the piston in rapid succession (FIGS. 14 and 18). When the eccentric raises the piston 30, it forces the pool of hydraulic liquid in the closed reservoir 26 against the piston 24. This is effective to push the piston rod 12 forward and project the ram on its outer end from the barrel to an extent determined by the size and eccentricity of the disk 34, so that it way force a blank delivered in front of the ram through the dies D (FIG. 3D).

To return the ram with utmost speed to its initial position upon completion of the can-forming forward stroke thereof, i.e., as soon as the rotating eccentric permits the actuator piston 30 to drop and with the piston 30 releasing its pressure upon the liquid in reservoir 26, the piston rod 12 carries within the second portion 16 of the barrel a second piston 48. Piston 48 is at all times yieldably urged in a direction opposite to the direction in which the positive hydraulic pressure is applied to the piston 24 by a cushion of compressed air that is maintained in the hollow interior 50 of a column 52 which communicates with the interior of the second portion 16 of barrel 10 through an opening 54 at a point in front of said second piston 48 (FIG. 2). In the embodiment of the invention illustrated in the accompanying drawings, the column 52 advantageously has the added function of supporting the front end of the barrel. The interior of column 52 is supplied with compressed air from a suitable source (not shown) by means of a conduit 56. In order to maintain the pressure of air in said column and the barrel portion 16 at a uniform level, conduit 56 contains a pressure-regulating valve represented by the circle 58 in FIGS. 2 and 14. During the upward stroke of the actuator piston 30, the positive hydraulic pressure applied to the piston 24 overcomes the opposing pressure of the air cushion applied to piston 48, but as soon as the eccentric 34 permits the actuator piston 30 to recede from its position of maximum amplitude, the compressed air in column 52 and barrel portion 16 becomes immediately effective to return the piston rod 12 and hence the ram to their initial position (FIG. 3A).

In the exemplary embodiment of the invention described herein, the blanks have the form of shallow cups, such as illustrated at B in FIG. 6. In order to maintain these cups in their proper position from the instant when they are engaged by the advancing ram at the beginning at its forward stroke until they are drawn through the dies, a cup-holding device 60 is received within the end of the second barrel portion 16 in the space between the inner wall of said barrel portion and the ram (FIG. 3A) for initial sliding movement in unison with, but independently from, the ram from an initial position wherein it leaves sufficient space between its front edge and the first of the dies for a blank to be delivered thereinto (FIG. 3A) to a position wherein it holds the bottom of a blank against said first die (FIG. 3C).

The ram advantageously has a diameter equal to the internal diameter which the completed container is intended to have, and the second barrel portion 16 within which it moves has a significantly larger internal diameter than the diameter of said ram. Adjacent its outer end, however, the barrel portion 16 has a restricted area of limited axial length that may be established by a sleeve 62 of suitable wall thickness which bears against and is suitably anchored in the inner surface of barrel portion 16. Slidably interposed between and forming an airtight seal with the sleeve 62 and the ram is the body portion 64 of the cup-holding device which has the form of a thick-walled sleeve. At its outer or forward end body portion 64 carries firmly secured thereto a sleeve 66 of the same internal diameter as the body 64, and sleeve 66 projects into the blank-receiving portion 18 of the barrel. This sleeve constitutes the cup holder proper and its external diameter is of such size that it slides snugly into the interior of a cup-shaped blank (FIG. 3B). The piston rod 12 upon which the ram is mounted is of a somewhat lesser diameter than the ram, and interposed between said piston rod and the body of the cup-holding device is the tubular stem portion 68 of an apertured disk 70 that surrounds the piston rod and is firmly secured to the inner end of cup-holder body 64. The free face of said disk is recessed as shown at 71, and the disk is of such a diametrical size as to extend radially a limited distance beyond the outer surface of the cup-holder body 64, yet leave an annular space 72 between its peripheral edge and the inner surface of the barrel portion 16.

The compressed air in said barrel portion 16 acts at all times against the disk 70 and urges the cup-holding device at all times toward the dies D but the end of piston rod 12 adjacent the ram is provided with an annular retaining member 74. Said retaining member engages the inner edge of the tubular stem 68 of disk 70 and limits outward movement of the cup-holding device relative to the piston rod and the ram under the urgency of the compressed air to the position illustrated in FIG. 3A wherein the front edge of the cup-holding sleeve 66 in substantially flush with the front face 80 of the ram. When the ram is in its fully retracted position, as illustrated in FIG. 3A, both the sleeve 66 and the ram leave sufficient space for a blank to be delivered in front of the first of the dies.

After a blank has been placed into its proper position before the ram, with its hollow side facing the ram, and the ram begins its advance propelled by the upward stroke of the actuator piston 30, the compressed air in the second barrel portion acts upon the disk 70 and forces the cup-holding device to advance in unison with the ram and enter and engage the interior of the cup-shaped blank (FIG. 3B) so that said blank retains its properly centered position as the advancing ram engages the bottom of the cup and begins to force the cup through the dies D (FIG. 3C). Forward movement of the cup-holding device in unison with the ram is limited, however, by engagement of a shoulder 76 formed by the area of disk 70 which projects radially beyond the body 64 of the cup-holding device, with the inner edge of sleeve 62 secured to the barrel. Said shoulder 76 comes against the inner edge of sleeve 62 when the front edge of the cup-holding sleeve 66 is spaced from the first of the dies by a distance substantially equal to or somewhat greater than the thickness of the sheet material from which the cup is made (FIG. 3C). During the following drawing operation effected by the continuing advance of the ram, the compressed air behind the disk 70 holds the leading edge of the cup-holding sleeve 66 with a predeterminable pressure in its proper cup-engaging position. This pressure, of course, depends upon the amount of air pressure set up in accumulator column 52 and barrel portion 16 and is so chosen as to prevent crinkling of the wall of the cup as it is drawn through the dies.

Upon completion of the forward stroke of the ram, the actuator piston 30 releases the liquid in reservoir 26 and the compressed air in accumulator column 52 and barrel portion 16 effects return movement of the piston rod 12 and the ram in a single uninterrupted stroke. At this time the effect of said compressed air upon the disk 70 maintains the cup-holding device momentarily in its forwardly projected position until the annular retaining member 74 on the returning piston rod 12 engages the edge of the tubular stem 68 of disk 70, at which moment the front face 80 of the ram is again substantially aligned with the front edge of the cup-holding sleeve 60. From this moment on, the cup-holding device is forced to participate in the return movement of the piston rod 12 in spite of the effect of the compressed air upon its disk 70 because the area of the cup-holding device that is effectively exposed to the compressed air in barrel section 16 is smaller than the effective area presented to the compressed air by the piston 48. Thus, both the ram and the cup-holding device return in unison to their initial positions (FIG. 3A). Another cup-shaped blank may now be delivered into the space in front of the ram, and another cycle in the operation of the machine may commence. As indicated in FIGS. 2, 3A and 3C, vents V are provided in barrel 10 for the purpose of allowing atmospheric air to enter and exit barrel 10 behind piston 24 upon the forward and return strokes of the piston 24, respectively, in order to avoid undesirable pressure changes in the barrel 10 between pistons 24 and 48.

Figure 4:
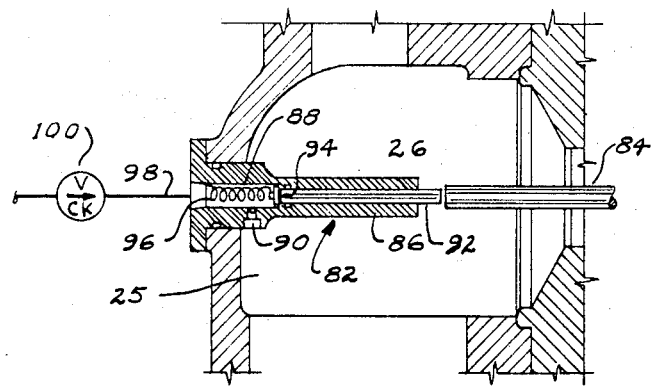
FIG. 4 is a detail view illustrating a component mechanism of the machine shown in FIG. 2.

To produce containers of substantially uniform length and wall thickness and to render effective a can-stripping mechanism S at the end of the assembly of the can-drawing dies D, it is necessary that the amplitude of the forward stroke of the ram be always precisely the same, and that the front surface 80 of the ram reach with every forward stroke precisely the same vertical terminal plane. For this purpose, it is essential that the quantity of hydraulic liquid in reservoir 26 be at all times precisely the same because it is obvious that when liquid is lost from the reservoir the upward stroke of the actuator will not project the ram the required extent from the barrel 10. The present invention therefore provides a mechanism which senses any loss in the quantity of the liquid in the reservoir such as may occur by seepage past the pistons 24 and 30 and which replenishes any such loss promptly and automatically without the necessity of interrupting the operation of the machine. In accordance with the invention, a normally idle replenishing pump 82 (FIGS. 2 and 4) is arranged within the reservoir 26, and is actuated by the piston rod 12 to deliver small amounts of liquid into the reservoir whenever the return stroke of the piston rod exceeds a predetermined critical limit. For this purpose, the piston 24 is provided with a rearwardly directed stem 84. Arranged in the rear wall of the reservoir and in axial alignment with stem 84 is a tubular housing 86 which forms a chamber 88 for holding a small supply of fluid. Chamber 88 communicates through a normally closed relief valve 90 with the interior of reservoir 26. Slidably received in the end of said housing in axial alignment with the stem 84 on piston 24 is a plunger 92 which carries a piston disk 94 within the chamber 88. A spring 96 arranged within said chamber and bearing against disk 94 urges said plunger into a position wherein its opposite end projects a limited distance from the housing 86. The chamber 88 in housing 86 may be kept supplied with liquid from a line 98 through a check valve 100 (FIGS. 4 and 14). As long as precisely the required quantity of liquid is in reservoir 26, the return stroke of the piston rod 12 as effected by the compressed air in column 52 will cause movement of the stem 84 on piston 24 to a position wherein it contacts but does not push the projecting end of the plunger 92 into the housing 86. When there is a loss of liquid from the reservoir 26, however, the piston 24 moves further backwards to an extent proportional to the amount of liquid lost and its stem 84 pushes the plunger 92 of pump 82 into the housing 86 building up the pressure within chamber 88 to an extent where the valve 90 opens in the fashion of a relief valve and the proper amount of liquid is dispensed into the reservoir 26.

Figure 5:
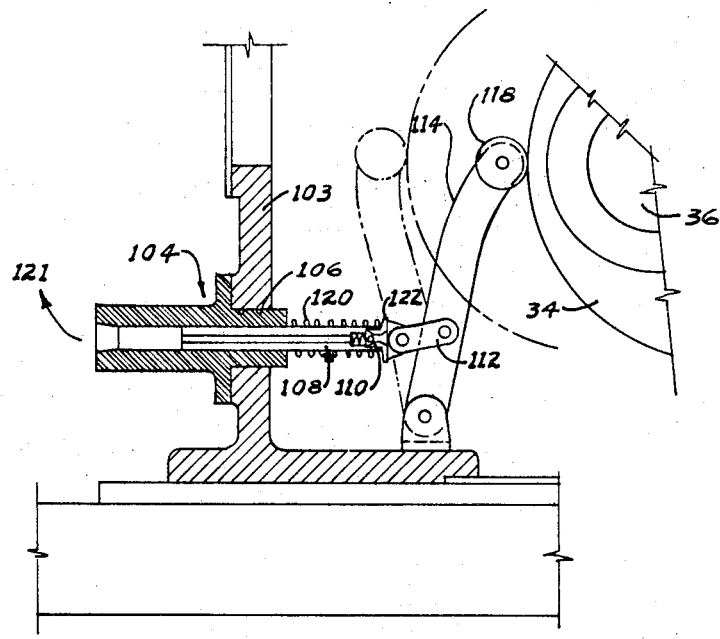
FIG. 5 is a detail view illustrating another component mechanism of the machine.

In the embodiment of the invention illustrated in the accompanying drawings, the chamber 88 in the replenishing pump 82 is kept primed with liquid by the action of the eccentric cam disk 34 from a common tank 102 that is formed around said disk, as shown in FIG. 2. Tank 102 may in fact be an extension, around the eccentric 34, of the cylindrical portion or housing 28 within which the hydraulic piston 30 reciprocates. Arranged in the wall 103 of said tank at a level below the minimum level of liquid in said tank is a pump 104 (FIG. 5) which is actuated by the eccentric 34 and which supplies liquid from said tank through the hereinbefore-mentioned check valve 100 to the chamber 88 of replenishing pump 82 (FIGS. 4 and 14). The pump 104 may comprise a tube 106 that passes through the wall 103 of tank 102 and within which is slidably received an axially bored plunger 108. At the end of said plunger which projects into the tank 102, its bore is provided with a check valve 110 that permits liquid to pass from the interior of the tank through said bore into the tube 106 but does not permit liquid to flow from the tube through said bore into the interior of the tank. The end of plunger 108 disposed within tank 102 is pivotally connected by a link 112 to an arm 114 that is pivotally supported from the bottom of the tank 102. The free upper end of said arm carries a cam follower roller 118 which is constantly urged into engagement with the edge of the eccentric 34 by a spring 120 that is coiled around the projecting end of plunger 108 between the inner edge of tube 106 and a disk 122 formed by the body of the hereinbefore-described check valve 110. When the lower level sector of the eccentric 34 passes underneath the cam follower roller 118, the spring 120 operates to draw the plunger 108 from the tube 106 into the interior of the tank causing liquid from the tank to pass through the valve 110 and the bore of plunger 108 into the tubular housing 106. When the high level sector of the eccentric moves underneath the cam follower roller 118, however, it pushes the plunger 108 deeper into the tubular housing 106. This is effective to close the check valve 110 and drive the liquid previously drawn into said housing along a line 121 through a relief valve 123 (FIG. 14) and through the repeatedly mentioned check valve 100 into the chamber 88 of the replenishing pump 82. The relief valve 123 is provided to avoid an excessive pressure build-up in the chamber 88 of the replenishing pump such as might inappropriately open the replenishing valve 90, and to this effect said valve 123 is arranged to return any liquid arriving in line 121 by the action of pump 104 through a by-pass line 124 to the tank 102 when the pressure developed in line 98 reaches a valve approaching the pressure level at which the replenishing valve 90 might open up. The described arrangement for priming the chamber 88 of the replenishing pump 82 from the tank 102 is therefore such that it will always maintain the chamber 88 in a filled condition, without the danger that it might accidentally cause premature operation of the replenishing valve 90.

*The blank feeding apparatus*

As previously pointed out, the machine of the invention is equipped with apparatus F for delivering cup-shaped blanks in timed relation with the operation of the ram to the blank or workpiece-receiving station 18 into proper position for engagement by the ram and the cupholding device 60. This apparatus comprises a magazine 125 which is mounted adjacent the blank-receiving portion of the barrel (FIGS. 1 and 2) and into which the blanks are delivered with their open ends facing the direction of approach of the ram to form a vertical stack of superimposed cups (FIG. 9). The blank-feeding apparatus further comprises a reciprocating slide 140 at the bottom of the magazine which removes the lowest blank from the stack and pushes it in two successive steps in a direction transversely of the barrel into its proper position before the withdrawn ram.

Figure 7:
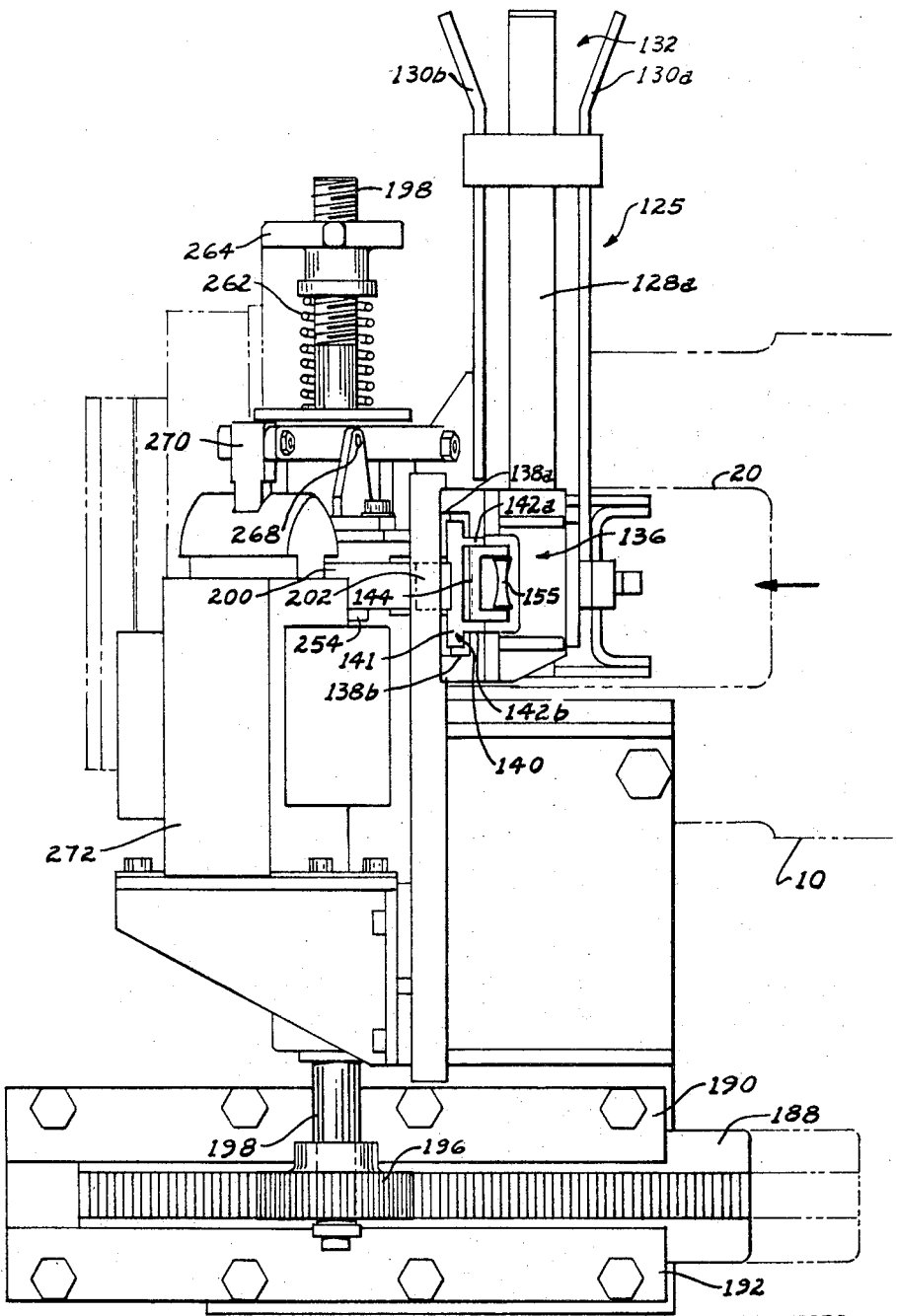
FIG. 7 is an elevation of the blank-feeding apparatus of the invention viewed in the direction of the arrows 7—7 of FIG. 1.

In the embodiment of the invention illustrated in the accompanying drawings, the magazine is formed by pairs of relatively spaced, vertically disposed bars 128a, 128b, and 130a, 130b (FIGS. 7, 8A and 8B) that are arranged to define a rectangular space slightly larger in size to a diametrical section through a blank. The upper ends of said bars may be bent outwardly to some degree as shown at 132 in FIGS. 2 and 7 to form a funnel structure which facilitates insertion of the blanks. At the bottom of the magazine the bars 128a and 128b are bent at right angles to form vertically spaced horizontal runs 134a and 134b, respectively, (FIG. 9) which extend through the hereinbefore-mentioned lateral opening 29 in the blank-receiving portion 18 of the barrel and across said barrel portion at opposite sides of the center axis thereof to form a corridor 136 that leads from the bottom of the magazine 125 into said barrel portion 18 adjacent the first of the dies D. One flank or side of said corridor is formed by a pair of opposed, vertically spaced guideways 138a and 138b that are suitably supported from the frame of the machine and which guide and support between themselves the longitudinal edges of a reciprocating slide 140. This slide is formed by a board 141 (FIG. 12) that carries upon its inner face two longitudinally extending vertically spaced parallel ledges 142a and 142b which mount at longitudinally spaced points two vertically disposed pivot pins 144. Rotatably supported upon each of said pins is the center bar 146 of a U-shaped bracket 148. Coil springs 150 urge the brackets 148 yieldably into rotary positions determined by engagement of a bevelled edge surface 152 of said center bars with the floor 153 of the slide (FIGS. 8A and 8B) wherein their side bars 154a and 154b form an acute angle relative to the floor of the slide and project in a forward direction laterally into corridor 136. Rotatably supported between the free ends of the side bars or arms 154a, 154b of both the brackets 148 are rollers 155 of a concave cross-sectional contour corresponding to the convexity of the side wall of the cup-shaped blanks. The described brackets with their rollers 155 serves as impellers which move under the urgency of the springs 150 into position behind the blanks in corridtor 136 at the end of the backward stroke of the slide (FIG. 8A) to engage the cups with said concave roller 155 and push them forwardly along the corridor 136 during each forward stroke of the slide (FIG. 8B).

During the succeeding backward stroke of the slide, the side bars 154a and 154b and the roller 155 of the leading impeller 148–L come against the newly advanced cup and submerge against the urgency of spring 150 underneath the bottom of said cup until they have passed in a backward direction underneath the cup whence they emerge against under the urgency of said spring 150 so that the roller 155 of said leading impeller 148–L may engage the rear segment of said cup and push said cup forwardly with the next forward stroke of the slide 140 (FIG. 8A). As the side bars and the roller of the leading impeller come against the front segment of the cup and submerge below and slide along the bottom of said cup, there is danger that they may shift the cup backwardly to an extent that makes it impossible for the impeller 148–L to emerge and assume its proper position behind the rear segment of the cup. The trailing impeller 148–T of the slide 140 cannot misoperate in this manner because during the return stroke of the slide the trailing impeller comes against and submerges below the bottom of a newly deposited cup whose rear segment bears against the rear bar 128b of the magazine and which therefore cannot yield backwards. A means is therefore provided to prevent back-sliding of the cup that has been advanced by the trailing impeller 148–T when return movement of the slide brings the leading impeller 148–L into contact with the front segment of the cup. For this purpose a latch lever 160 (FIG. 9A) is pivotally supported from the outer surface of the bar-shaped opposite side wall 162 of the corridor 136 (FIGS. 8A, 8B and 9) and a spring 164 interposed between its tail 166 and said side bar 162 urges its nose 167 through a slot 168 yieldably into the path of a cup that is propelled through the corridor 136 by the trailing impeller 148–T. When a cup has been advanced a predetermined amount by impeller 148–T a recess 170 in the nose of the latch lever 160 engages the trailing edge of the cup and blocks positively any return movement of said cup and at the time inhibits uncontrolled forward movement of the cup. Hence, during the succeeding return stroke of the slide, the cup is positively blocked from sliding backwards and the leading impeller 148–L submerges below its bottom without changing the location of the cup and moves into position behind the trailing sector of its wall under the urgency of spring 150 so that it may engage and further advance the cup during the next forward stroke of the slide 140 (FIG. 8B).

While the side wall 162 of the corridor 136 terminates a safe distance ahead of the path of the ram, the bars which form the floor and the ceiling of corridor 136 extend above and below the center axis of the barrel to the opposite side of the barrel as previously pointed out. At said opposite side they are bolted to a block 172 that rests in a lateral aperture 173 of the barrel and which presents a trough-shaped recess 174 to a cup advanced between said bars. The converging side walls 176a and 176b of said recess stop the cup in precisely the position wherein its center axis coincides with the center axis of the ram (FIG. 9).

The operation of the reciprocating slide 140 is synchronized in such a manner with the operation of the piston rod 12 and the cup holder 60, respectively, that the slide 140 performs a forward stroke which causes its leading impeller 148–L to place a cup in position against the block 172, while the ram and the cup-holding device are still in the process of withdrawing from a preceding forward stroke, and the said slide remains in its forwardly projected position for a brief period of time so that its leading impeller continues to hold the cup in position against the block 172 until the frontal sleeve 66 of the cup-holding device 60 has entered the cup and taken over the task of holding the cup in its proper position for action thereon by the simultaneously advancing ram (FIG. 3B).

To actuate the slide 140 in the required synchronism with the piston rod 12 that controls the operation of the ram and the cup-holding device, the slide is preferably actuated from the same shaft 36 that drives the eccentric 34 which controls the position of the actuator piston 30. Having reference to FIGS. 1, 2, 10, 11 and 13, said shaft 36 carries exteriorly of tank 102 a disk 178 to which is adjustably bolted a box cam 180, and engaged in the groove 182 of said box cam is a cam follower roller 184 that is pivoted to an arm 185 at an intermediate point thereof. This arm is rotatably supported from the base of the machine, and an elongated link 186 of adjustable length connects the free upper end of said arm pivotally to a slide 188 (FIGS. 7, 10 and 13) which is held for reciprocating horizontal movement in a direction parallel to the path of movement of the ram in and between a pair of vertically spaced guideways 190 and 192 that are suitably supported from the machine frame below the magazine 125 for the blanks. The slide 188 carries firmly secured thereto a rack bar 194 that meshes with a pinion 196 which is secured to a vertically disposed shaft 198 that is rotatably supported from the machine frame. A clutch collectively identified by the reference numeral 199 couples a pinion 200 releasably to said shaft for rotation therewith at the level of the cup advancing slide 140 and said pinion 200 in turn meshes with a rack bar 202 that is firmly secured to the back of said slide.

Figure 11:
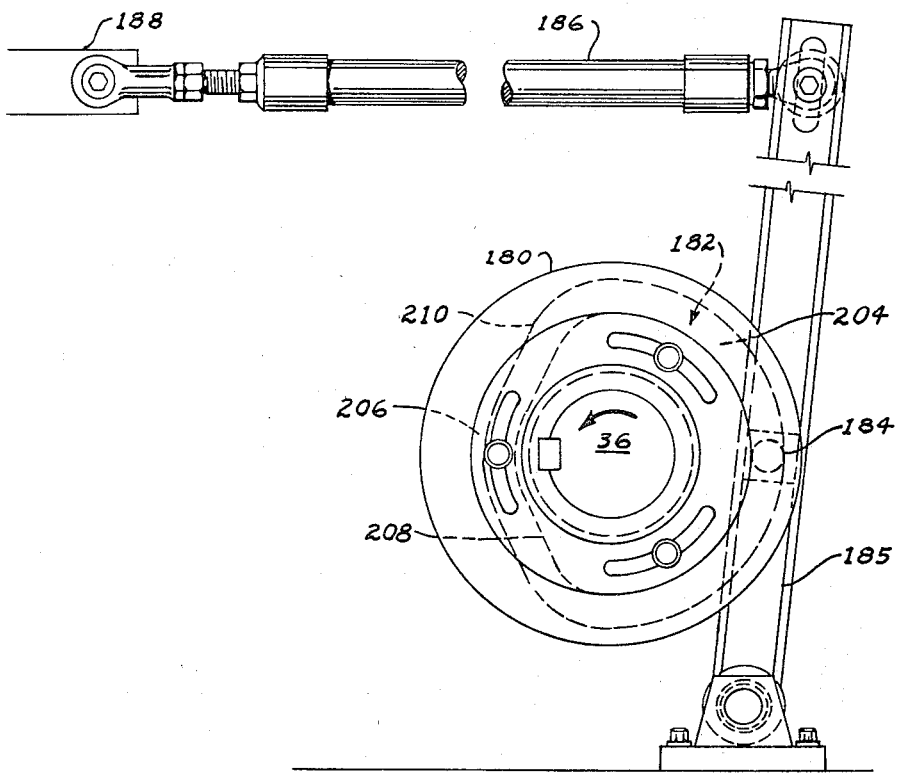
FIG. 11 is a side elevation viewed in the direction of the arrows 11—11 of FIG. 1 of the initial portion of the power train illustrated in FIG. 10.

The groove 182 of the box cam 180 advantageously forms a uniform dwell 204 of about 170° from which it drops to, and to which it returns from, a depression 206 of brief duration such as 30° in a substantially symmetrical pattern (FIGS. 11 and 18). While the cam follower roller passes through the dwell 204 of groove 182, the cup-feeding slide 140 remains in retracted position (FIG. 8A) wherein its impeller 148–T is located behind the cup at bottom of the magazine and its impeller 148–L is located behind a cup that has been advanced along the corridor 136 by a previous forward stroke of the slide and which is to be placed into position before the ram and the cup-holding device 60 with the next forward stroke of said slide. When the cam follower roller passes through the descending sector 208 of the box cam groove 182, the resultant stroke of arm 185 (FIG. 11) causes the rack bar 194 on slide 188 to turn the pinion 196, the shaft 198 and the pinion 200 in counterclockwise direction (as viewed from the top). The pinion 200 by its engagement with the rack bar 202 at the back of slide 140 causes the slide to advance so that its impeller 148–L pushes the cup against the block 172 which places it in precisely its proper position with its bottom directly adjacent the first of the dies. As the cam follower roller 184 negotiates the uniform depression 206 of the cam groove 182, the leading impeller 148–L of the slide 140 holds the cup against the block 172 until the leading sleeve 66 of the cup-holding device 60 moves into said cup and the cup can no longer be dislocated (FIG. 3B). As the continually advancing ram reaches the bottom of the cup (FIG. 3C) and begins to push the cup through the dies, the ascending sector 210 of the box cam groove 182 pushes the arm 185 to the right, as viewed in FIG. 11, causing the slide 140 to withdraw its leading impeller 148–L from the cup in barrel portion 18 and to return to its initial position wherein its said leading impeller takes up position behind the next cup to be processed and its trailing impeller 148–T takes up position behind the cup that has just reached the bottom of the magazine.

*Safety devices*

Figure 1:
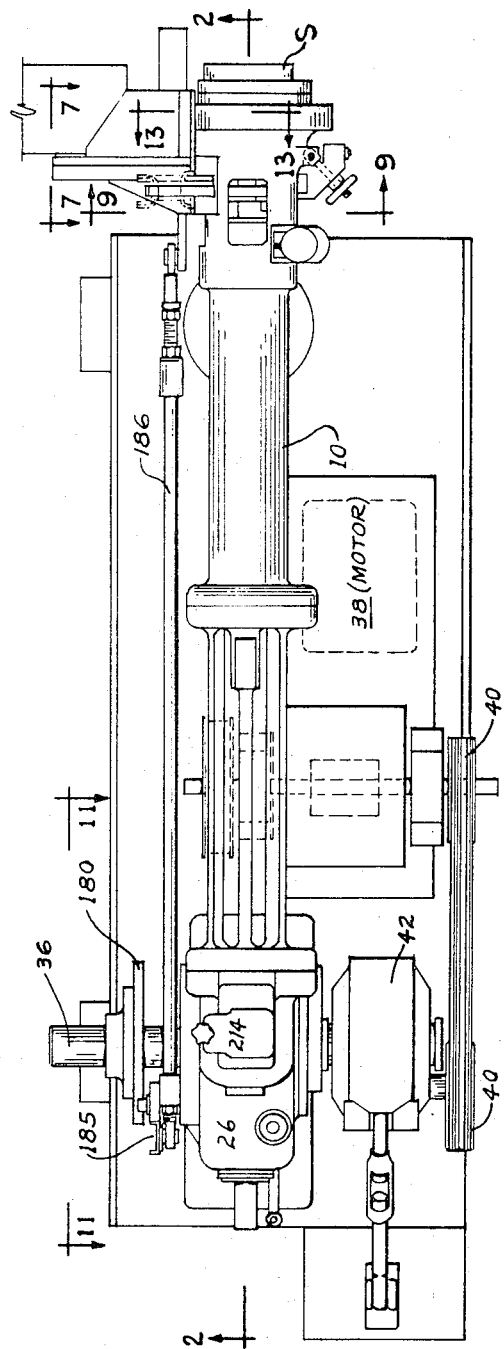
FIG. 1 is a general plan view of a container-forming machine constructed in accordance with the invention.

The machine of the invention comprises mechanisms which sense whether a cup placed before the dies is defective or improperly positioned, and, if it is, operate to suspend performance of both the can-forming ram and the cup-feeding apparatus to prevent a defective or mispositioned blank from being jammed into the dies. For this purpose, a large relief line 212 leads from the top of the reservoir 26 back into the tank 102, and is normally closed by a relief valve 214 that may be arranged on top of said reservoir (FIGS. 1, 2 and 14). Said relief valve is controlled by a vent valve 216 that is held in an inoperative condition by a normally energized solenoid 218 (FIG. 14). The power circuit of said solenoid comprises two parallel switches $S_1$ and $S_2$, each of which is capable of maintaining the solenoid 218 in energized condition. Switch $S_1$ is initially closed, but is opened by the advancing piston rod 12 at a predetermined point of its forward travel; and switch $S_2$ is initially open, but is closed by the cup holder 60 (FIG. 3C) as it advances in unison with the ram, shortly before switch $S_1$ is opened, provided the cup holder encounters no improper resistance such as might be indicative of the presence of a defective or improperly positioned cup in the blank-receiving portion 18 of the barrel. Reverting to FIG. 2, switch $S_1$ which is schematically represented by a circle may be opened by the upward thrust of a stem 220 that passes through the barrel portion 14 near its junction with barrel portion 16 and carries at its inner end a roller 222 that rides upon the piston rod 12. The front portion 12–F of the piston rod 12 is of a smaller diameter than the rear portion 12–R thereof, and as long as the roller rides upon said front portion the switch $S_1$ remains closed and keeps the solenoid 218 in energized condition. As a result thereof, the relief valve 214 remains closed. As soon as the roller 222 negotiates the step 224 between the front and the rear portions of the piston rod, however (FIGS. 2 and 3C) the actuating stem 222 is thrust upwardly and opens the switch $S_1$. Under normal conditions, i.e., when everything is in working order, this has no effect upon the state of energization of the control solenoid 218 because before switch $S_1$ is opened switch $S_2$ has been closed by the cup-holding device 60 which advances initially in unison with the piston rod 12 and the ram as previously described. Switch $S_2$ has an actuating stem 226 that passes through the barrel portion 18 adjacent the end of barrel portion 16 and its inner end is provided with a roller 228 that rides upon the outer surface of the cup holder 60 and which maintains the switch $S_2$ in open condition as long as it rides upon the outer surface of said body portion 64 (FIG. 3A). As explained hereinbefore, the compressed air enclosed in column 52 and the space of barrel portion 16 between the piston 48 and the cup holder 60 urges the cup holder to advance initially in unison with the ram during its forward stroke and to engage with its front sleeve 66 the interior of a properly positioned blank before the ram commences to press the blank through the dies. The outer surface of the cup-holder body 64 has an annular groove 230 and when the cup-holder body 64 advances without encountering an obstruction, the roller 228 on stem 226 eventually encounters and drops into said groove, which causes switch $S_2$ to close (FIG. 3C). The location of the groove 230 longitudinally of the body portion 66 of the cup holder is so chosen that when the machine performs normally the groove 230 slides under roller 228 briefly before roller 222 is forced to negotiate the step 224 of piston rod 12. Hence, for a brief moment both branches of the power circuit of the control solenoid 218 are closed (FIG. 14), and when continued advance of the piston rod is effective to open switch $S_1$, the power circuit of the solenoid 218 remains closed through the branch which includes the switch $S_2$. As a result, the machine continues its operation uninterruptedly. However, whenever the sleeve 66 of the cup holder encounters any resistance in its advance due to the presence of a defective or inappropriately placed blank which cannot be entered smoothly by sleeve 66, its progress is arrested while the piston rod 12 continues to advance, because while the piston rod 12 is positively propelled by the incompressible liquid in reservoir 26, the cup holder advances under propulsion by a compressible cushion of air. Thus, the groove 230 in the cup-holder body does not reach the roller 228 of switch $S_2$ and said switch remains open. The advancing piston rod, however, moves its rear portion 12–R of larger diameter underneath the roller 222 of switch $S_1$ and throws said switch open. Now both the branches of the power circuit of the control solenoid 218 are interrupted causing de-energization of said solenoid 218 and the opening of vent valve 216. The opening of vent valve 216 in turn causes an unbalance in relief valve 214 whereby valve 214 opens. The hydraulic fluid contained in reservoir 26 may now escape through line 212 into the tank 102, and the upward stroke of the hydraulic piston 30 is no longer effective to advance the piston rod. The ram, therefore, comes to an immediate halt before it has a chance to act upon the defective or mispositioned blank, and the compressed air in the interior of column 52 forces it to withdraw in the opposite direction to a position determined by engagement of its piston 48 with a shoulder 232 formed in the interior of the barrel at the junction of its first and second portions 14 and 16, respectively. The location of said shoulder 232 in a direction axially of the barrel is such that it positions the piston rod only very slightly more to the left, as viewed in FIG. 2, than its proper full cycle position when the hydraulic reservoir 26 is filled with precisely the proper amount of liquid and the actuator piston 30 is in its lowermost position (FIG. 3A).

The machine of the invention comprises apparatus for reconditioning the hydraulic reservoir 26 for renewed effective operation of the machine whenever the defective or dislocated cup has been removed from the cup-loading station 18 of the barrel. For this purpose a cylindrical container 234 (FIG. 14) is mounted upon the base of the machine adjacent the tank 102. Liquid from the interior of the tank 102 may flow into the container 234 through a line 236 provided with a check valve 238. The container will be filled with liquid from the tank by upward movement of a piston 240 that is slidably received in the container 234 and which is urged toward the ceiling of the container by appropriately placed spring means schematically indicated at 242. The space of container 234 above the piston 240 may be connected to the hereinbefore-mentioned source of compressed air by manipulation of a three-way, two-position valve 244 which normally connects said space to the outside atmosphere. A conduit 246 leads from the bottom of the container 234 through a check valve 248 into the reservoir 26. When it is desired to recondition the hydraulic reservoir after the relief valve 214 has been opened by operation of aforedescribed safety mechanism, the valve 244 is set to deliver compressed air into the container above the piston 240. The compressed air now forces said piston downwardly against the urgency of spring 242 and drives the required amount of liquid through the line 246 and check valve 248 into the reservoir 26, and when the reservoir 26 has been replenished the valve 244 is returned to the position wherein it connects the top of container 234 to the atmosphere. The spring 242 may now raise the piston 240 causing the proper amount of liquid to be drawn from tank 102 through line 236 into the container 234.

Figure 10:
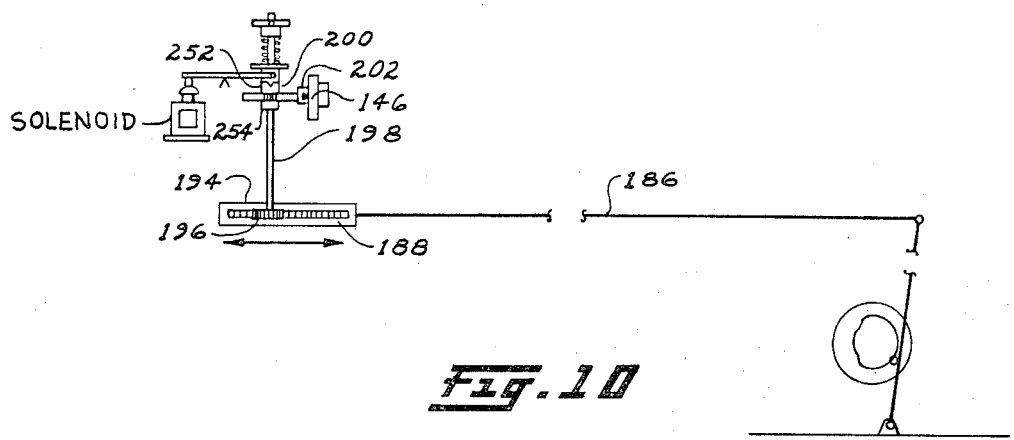
FIG. 10 is a diagram illustrating schematically the power train between the main drive shaft of the machine and the mechanism of the blank-feeding apparatus for delivering blanks from a magazine to the blank-receiving station of the actual container-forming mechanism.
Figure 13:
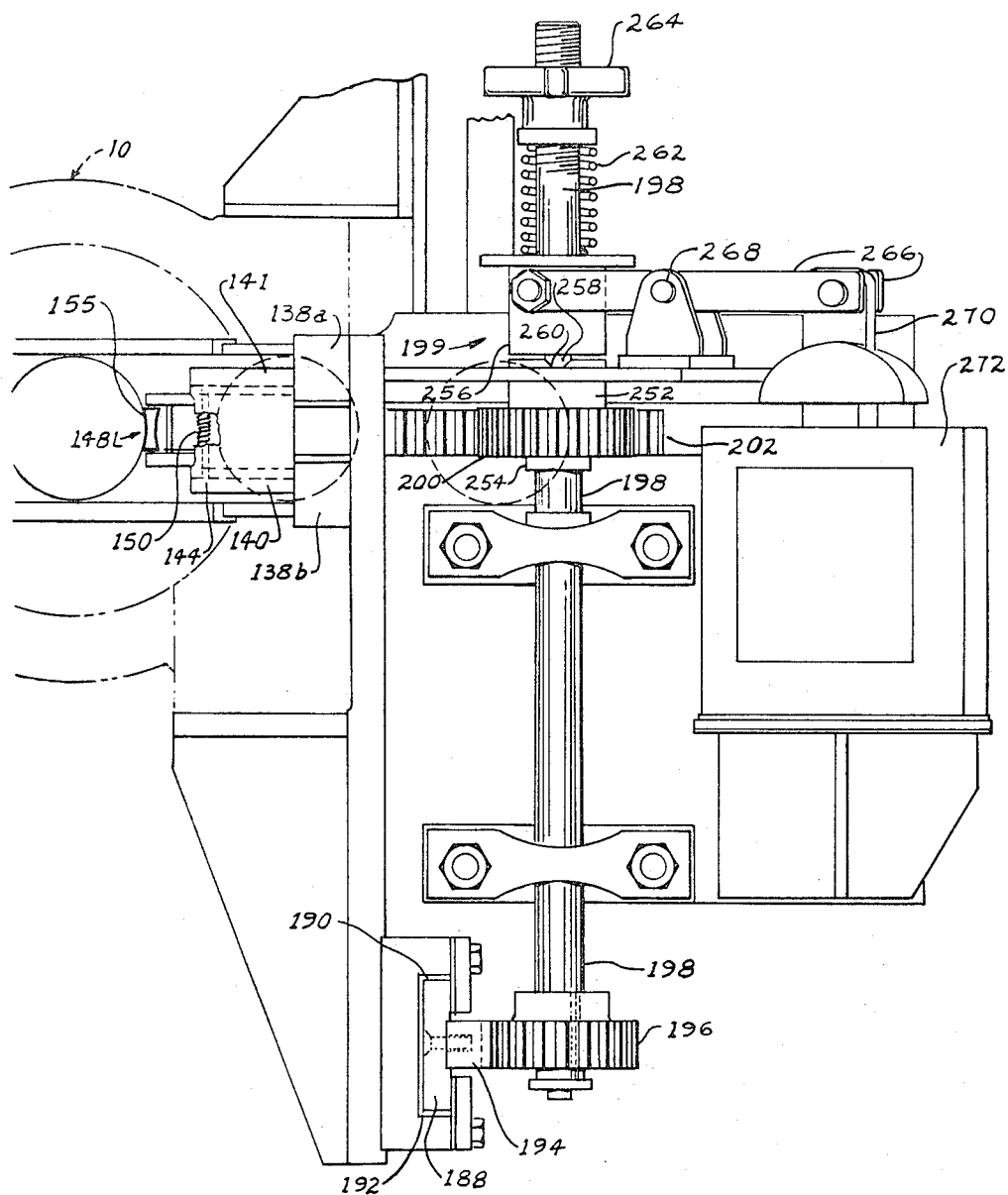
FIG. 13 is an elevation viewed in the direction of the arrows 13—13 in FIG. 1 which illustrates the terminal portion of the power train represented schematically in FIG. 10.

As pointed out previously, the machine of the invention is also arranged to suspend operation of the blank-feeding apparatus whenever the cup-holding device 60 encounters abnormal conditions indicative of the presence of a defective or inappropriately placed blank in the blank-loading zone of the machine. As indicated hereinbefore, the vertical shaft 198 in the power train between box cam 180 and the reciprocating slide 140 of the cup-feeding apparatus is releasably secured by a clutch arrangement 199 to the pinion 200 which meshes with the rack bar 202 on the outer surface of said slide. For this purpose, the tubular hub 252 of said pinion is arranged loosely about the shaft 198 and rests for support upon a collar 254 that is pinned to said shaft below said pinion (FIGS. 10 and 13). Above the pinion 200 a bushing 256 is keyed to the shaft 198 so that it is constrained to participate in the rotation of said shaft but may slide axially along said shaft. The end of said bushing which faces the pinion 200 is provided with a tooth 258 that engages a recess 260 in the hub 252 of said pinion. A spring 262 coiled about the upper end of shaft 198 and compressed between the bushing 256 and a knob 264 secured to the upper end of the shaft 198 yieldably maintains the bushing 256 in a position wherein its tooth 258 engages the gap 260 so that the pinion is normally constrained to oscillate with the bushing 256 and the shaft 198 and actuate the cup-propelling slide 140. In accordance with the invention, means are provided that disengage the tooth 258 of bushing 256 from the gap 260 of the hub 252 whenever the advancing cup holder 60 of the machine encounters improper resistance during the forward stroke of the ram and switch $S_2$ fails to close before switch $S_1$ is opened by step 224 of the advancing piston rod 12. For this purpose, the bushing 256 is pivotally supported by a pair of twin levers 266 fulcrumed at 268 (FIG. 13) to the normally projected armature 270 of a normally de-energized solenoid 272 that is suitably supported from the machine frame adjacent the shaft 198. The power circuit of said solenoid includes a normally closed switch 274 (FIG. 14) which is held in open position by the hereinbefore-described solenoid 218 that controls the relief valve 214 as long as said solenoid 218 is energized. As previously described, said solenoid is energized as long as either switch $S_1$ or switch $S_2$ is closed. When switch $S_2$ fails to close (because the cup holder encounters an obstrucion), before the advancing piston rod 12 opens switch $S_1$ and as a result thereof the solenoid 218 is de-energized, the switch 274 is allowed to close. This energizes the solenoid 272 causing it to retract its armature 270. The retraction of armature 270 in turn raises the bushing 256 against the urgency of spring 262 causing its tooth 258 to release the recess 260 in the hub of pinion 200. As a result thereof, the rotary power of shaft 198 can no longer be transmitted to the pinion 200, and the operation of the cup-propelling slide 140 comes to a halt. The cup-feeding apparatus has suspended operation.

The control circuit for solenoid

It will be understood that the described control circuit of the clutch release solenoid 272 may include a conventional timing mechanism represented by the block T (FIG. 14) which may be controlled from the eccentric 34 on shaft 36, as indicated by the line 271, to suspend operation of the cup-feeding slide only when the slide has reached a predetermined position; for instance, its fully projected position.

The dies and the can stripper

Figure 15:
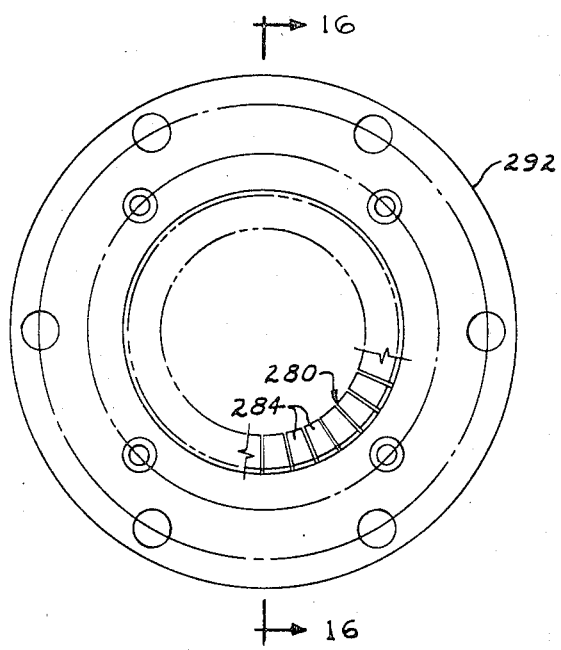
FIG. 15 is an end view of a novel stripping mechanism used with the container-forming machine of the invention.
Figure 17:
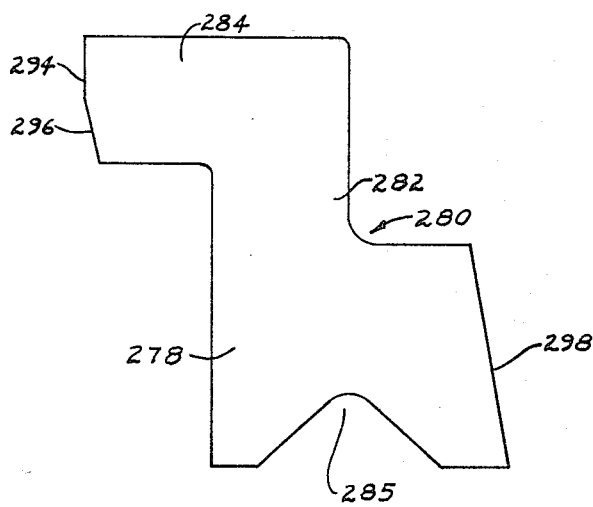
FIG. 17 is a side elevation on an enlarged scale of a component of the stripping mechanism illustrated in FIGS. 15 and 16A, B and C.

The assembly of dies D in the hereinbefore-mentioned tubular housing 22 at the end of the barrel structure is basically a sequence of aligned, axially spaced rings of progressively smaller internal diameters, with the internal diameter of the first ring slightly smaller than the external diameter of the cup-shaped blanks and the internal diameter of the last and smallest one slightly larger than the diameter of the ram so that the ram may push the elongated cup fully through said last ring to give it its final form. Arrangements of this type are described in the co-pending patent application Ser. No. 728,149 for Method and Apparatus filed on Apr. 14, 1958, Henry G. Henrickson, inventor and now issued as Patent No. 3,167,044 on Jan. 26, 1965, to which reference is made for details. When the ram returns to its initial position upon completion of the described drawing operation, the elongated cans tend to adhere to it and the present invention advantageously provides a mechanism that strips the newly formed containers or cans from the returning ram without damage to their edges. Having reference to FIGS. 2, 15 and 16A, bolted to the rear edge of the housing 22 which contains the die assembly D is a disk or lid 273 which has a central opening 275 of a diameter that is larger than the internal diameter of the last annular die by the expected wall thickness of the completed container. Adjacent the opening 275, the lid has an annular recess or groove 276 of rectangular cross section, and received in said groove are the base portions 278 of a multitude of loosely juxtaposed members 280 of the contour shown in FIG. 17. Said members have necks 282 that project rearwardly beyond the outer surface of the lid 273 and terminate in radially inwardly directed fingers 284. The bottom surfaces of the base portions of said members 280 form shallow recesses 285 of approximately triangular contour within which is engaged an O-ring 286 of resiliently yieldable material that is interposed between the bottom surfaces of the base portions of said members and the floor 288 of the groove 276 and which establishes a space of limited depth between the floor of the groove and said base portions, as shown in FIG. 16A. When the members 280 are in the position of rest illustrated in FIG. 16A, the fingers 284 project very slightly beyond the edge of the central opening 275 in lid 273. Another O-ring 290 of yieldably resilient material is arranged exteriorly around the necks of the members 280 in the corners formed by said necks and the top surfaces of the base portions 278, and the described assembly of members 280 is retained in the groove 276 by an annular disk 292 that is bolted to the lid 273 and which partially covers the groove 276 and bears against the outer O-ring 290. The inner edge of the end face 294 of the fingers 282 is bevelled, as shown at 296, to avoid any binding of a can pushed through the central opening 275 of lid 273 by the ram against the fingers 280, and the outer end surfaces 298 of the base portions 278 of members 280 are slanted to permit said members to tilt backwards a limited distance upon the O-ring 286 (FIG. 16B) and against the urgency of O-ring 290 when force is applied against the ends of fingers 282 from within.

When at rest, the members 280 assume the position illustrated in FIG. 16A wherein the outer O-ring 290 holds the inner wall 300 of their base portions flat against the inner wall of the groove 276 and the tips of their fingers 284 reach into the space defined by the opening 275 of lid 273. Said opening is about equal in diameter to the diameter of the last die, and hence is about equal in diameter to the external diameter of the completed can. The can-forming forward stroke of the ram is arranged to push the completed can fully through the lid 273 and past the tips of the fingers 282 which yield backwardly about the inner O-ring 286 against the resiliency of O-ring 290 (FIG. 16B) and return immediately to a position wherein their tips move close to the outer surface of, but without contacting, the ram once the edge of the newly formed can has passed. Thus, the tips of finger 282 define an opening of slightly less diameter than the external diameter of the container. Therefore, when the ram returns with the newly formed can adhering to its outer surface, the edge of the can comes against the tips of the fingers from the outside and the fingers block return of the can with the ram and strip the can from the ram (FIG. 16C); and since the members 280 are individually yieldable in a direction axially of the ram due to the yieldability of the inner O-ring 286, the pressure exerted upon the fingers 282 by any unevenness or defect in the rim of the newly formed can does not bear against one or only a few of the fingers but is evenly distributed and is therefore not likely to wrinkle or otherwise deform the rim area of the can and/or accentuate small defects in the rim that may have developed during the drawing operation.

The described container stripping arrangement is of relatively simple construction; it is such that it avoids jamming of the can during the ejection operation, and it protects the rims of the can during the actual stripping process.

*Operation*

The magazine 125 of the blank-feeding apparatus F is first filled with cups with their open ends facing the advancing ram and the motor 38 is set into motion. In the full cycle position of the machine in which the ram R is fully retracted (FIG. 3A), the eccentric 34 presents the lowest point of its contour to the cam follower roller 44 on the stem of the actuator piston 30 (FIG. 18), and the cam follower roller 184 on the arm 185 that forms part of the power train which actuates the slide 140 is in the process of negotiating the descending run 208 of the groove in box cam 180. This means that the slide 140 approaches its most advanced position wherein its leading impeller 148-L extends into the blank-receiving section 18 of the barrel.

It requires a complete cycle of 360° of rotation of shaft 36 involving a retraction and a complete forward stroke of the slide 140 to move the cup at the bottom of the magazine into position directly in front of the blank-receiving section 18 of the barrel, from where the next forward stroke of the slide pushes it into the path of the advancing ram. During this time, the ram passes idly through a full cycle of operation from an almost fully retracted position to a fully advanced position, and through a fully retracted position to a position representing the first phase of the next forward stroke. As the first cup is propelled along the corridor 136 by the forward stroke of the slide 140, a second cup drops to the bottom of the magazine 125 behind the trailing impeller 148-T of said slide; and after a second full cycle in the operation of the machine involving another idle forward and return stroke of the ram, the leading impeller of slide 140 moves the first cup toward the positioning block 172 in barrel section 18 (FIG. 8B). At this moment the cams 34 and 180 on shaft 36 are again in the position illustrated in FIG. 18. Upon continued clockwise rotation of the shaft 36 (as viewed in FIG. 18) cam 34 begins to raise the actuator piston 30, and in consequence thereof the hydraulic liquid in reservoir 26 begins to advance the ram (FIG. 19). The roller 184 on arm 185 completes its descent through sector 208 of the cam groove and passes through the low level sector 206 of said groove, and as a result thereof the slide 140 reaches and remains for a limited period in its fully projected position to hold the first cup securely against the positioning block 172. Upon further rotation of shaft 36, the ram and the cup holder 60 supported thereon enter the open end of the cup in the blank-receiving section 18 of the barrel while the leading impeller 148-L on slide 140 continues to hold the cup in position (FIG. 3B); and after both cup holder and ram have reached the bottom of the cup (FIG. 3C) and the ram begins to draw the cup through the first of the dies, the roller 184 on arm 185 encounters and negotiates the ascending slope 210 in the groove of the box cam causing retraction of the slide 140 (FIG. 19). As the slide is retracted, the leading impeller 148-L submerges underneath and moves into position behind the second cup in the corridor and the trailing impeller 148-T submerges underneath and moves into operative position behind the newly deposited cup at the bottom of the magazine (FIG. 8A). Due to engagement of the latch lever 160 with the trailing edge of the second cup, said second cup cannot be shifted backwards by the described return movement of the slide 140 (FIG. 9A), nor can it roll forwardly into the cup-receiving section of the barrel 10.

The first cup is now held in position by the cup holder 60; and, as continued rotation of shaft 36 places progressively higher points of the eccentric 34 underneath the cam follower roller 44 upon the stem of actuator piston 30, the ram is forced to continue its advance and draws the first cup through the dies (FIG. 3C). Due to engagement of the shoulder 76 of the cup holder with the inner edge of the sleeve 62, the cup holder remains in the position illustrated in FIG. 3C wherein it leaves sufficient space between its front edge and the first of the dies for the blank to be drawn through by the continuing advance of the ram. At the same time, the cushion of compressed air acting upon the disk 70 maintains the cup holder in the defined advanced position to counteract any tendency of the blank wall to crinkle as it is drawn through the first die. As this occurs, the roller 184 on arm 185 travels through the high level sector 204 of the groove of box cam 180 and thus maintains the leading impeller 148-L on the slide withdrawn from the blank-receiving section 18 of the barrel (FIG. 19).

When continued rotation of shaft 36 places the highest point of the eccentric 34 underneath the cam follower roller 44, the ram has pushed the cup fully through the dies and past the stripping mechanism S (FIGS. 3D and 16B), but the roller 184 on arm 185 rides still on the dwell 204 of the box cam groove and maintains the slide 140 in the retracted position illustrated in FIG. 8A. As previously pointed out, said dwell is of substantial angular width and the slide therefore remains in retracted position during most of the return movement of the ram as the continually rotating shaft 36 places points of progressively lower levels underneath the roller on the stem of the actuator piston 30, and said piston releases progressively its pressure upon the liquid in reservoir 26 and thus allows the compressed cushion of air in barrel portion 16 to effect this return movement of the ram (FIG. 19).

The initial phase in the return movement of the ram brings the edge of the newly formed container from the outside against the fingers 282 of the stripping mechanism S causing the newly formed container to be stripped from the ram without undue deformation of, or other damage, to its rim (FIG. 16C).

As the returning ram begins to emerge from the dies, the roller 184 on arm 185 reaches the descent 208 of box cam groove 182 and effects advance of the slide 140 (FIG. 19). This causes its leading impeller 148-L to move the second cup into the blank-receiving section 18 of the barrel as the lowest points of the eccentric move underneath the cam follower roller 44 of the actuator piston 30 and the ram passes through the final phase of its return movement. A cycle in the operation of the machine has been completed and another identical one is about to commence. Thus, in accordance with the invention, the blank-feeding apparatus is arranged to cooperate with the container-forming machine in such a manner that there is no interruption of slow-down in the continual operation of the latter as the former feeds the blanks to the container-forming machine. An added advantage of the described cooperation between the container or receptacle-forming ram and the blank-feeding apparatus resides in the fact that the blank-feeder mechanism at no time moves into the path of travel of the ram or the cup holder 66 associated with the ram.

If a loss of liquid from reservoir 26 occurs during operation of the machine, the compressed air in barrel section 16 may drive the piston rod 12 back farther than is normally possible at the stage when the eccentric 34 presents its lowest point to the roller 44 on the stem of the actuator piston 30. As a result thereof, the stem 84 on barrel piston 24 actuates the plunger 92 of the replenishing pump 82 and forces a metered amount of liquid from the chamber 88 of said pump through the valve 90 into the reservoir 26 to re-establish the proper operating conditions of the apparatus.

In the event that the cam-feeding apparatus delivers a defective blank to the blank-receiving station of the machine, or places a blank in improper position into the path of the ram, proper advance of the can holder 60 under propulsion by the compressed air in barrel section 16 is obstructed. Said can holder, therefore, cannot advance in unison with the ram to its final destination adjacent the first of the dies. Thus, the groove 230 in its outer surface is unable to reach the roller 228 on the actuating stem 226 of the normally open switch $S_2$ in the power circuit of the solenoid 218 that controls the relief valve 214 on top of the reservoir 26. Said switch, therefore, remains open. The ram continues its advance, however, and the step 224 of its piston rod 12 activates the stem of the normally closed switch $S_1$ in the parallel branch of the power circuit of said solenoid and throws said switch open. With both switches open, the solenoid 218 is de-energized. This causes the vent valve 213 to open the relief valve 214 permitting liquid in reservoir 26 to escape through relief line 212 as continued rotation shaft 36 places higher points of the eccentric 34 underneath the roller on the stem of the actuator piston 30 and causes said piston 30 to exert pressure upon the pool of hydraulic liquid in reservoir 26. The advance of the ram, therefore, comes to a halt and the compressed air in barrel 16 effects retraction of both the ram and the cup holder so that any defective or mis-located blank may be removed from the blank-receiving station.

De-energization of the solenoid 218 has the added effect of permitting closure of the power circuit of solenoid 272, and upon energization said solenoid disengages the clutch arrangement 199 that couples the drive pinion 200 of the cam-feeding slide 140 to the shaft 198 in the power train between the box cam 180 and said slide. Operation of the slide, therefore, comes to a halt, and the blank-feeding apparatus suspends delivery of new cups to the cup-receiving section 18 of the barrel. Although the invention has been described with particular reference to its use in making containers from cup-shaped metal blanks, it is to be understood that in various embodiments thereof it can be also advantageously employed in making containers from flat blanks, such as for example flat metal blanks of steel and aluminum and various alloys thereof.

An advantageous embodiment of the invention has been disclosed and described with respect to an exemplary embodiment thereof. It will be understood that various changes may be made therein without departing from the spirit and scope thereof, as defined in the appended claims, wherein what is claimed is:

1. Apparatus for delivering cup-shaped blanks to the barrel of a container-forming machine comprising corridor means leading laterally into the barrel of the container-forming machine and means including a slide for propelling the blanks along said corridor means and into said barrel, means for reciprocating said slide along said corridor means, a pair of spaced arms pivotally supported from said slide to extend forwardly therefrom, a roller pivotally supported between the free ends of said arms and means urging said arms yieldably into a position in which they slant relative to said slide so that upon forward movement of said slide said roller engages the rear wall of a cup-shaped blank in said corridor means and propels it forwardly, and upon rearward movement of said slide said arms submerge below the bottom of a succeeding cup-shaped blank.

2. Apparatus for delivering cup-shaped blanks to the barrel of a container-forming machine comprising a corridor means leading laterally into the barrel of the container-forming machine, and means for propelling the blanks along said corridor means into said barrel including a slide, means for reciprocating said slide along said corridor means, a pair of spaced arms pivotally supported from said slide to extend forwardly therefrom, a roller pivotally supported from the free ends of said arms, means urging said arms yieldably into a position in which they slant relative to said slide so that upon forward movement of said slide said roller engages the rear wall of a cup-shaped blank in said corridor means and propels its forwardly, and upon rearward movement of said slide the roller submerges below the bottom of a succeeding cup-shaped blank, and means supported from said corridor means and reaching yieldably into the path of advance of the cup-shaped blanks in said corridor means for positively blocking back sliding of an advanced cup-shaped blank during return movement of said slide while permitting continued forward movement thereof during the next forward stroke of said slide.

3. A blank propelling slide for the blank feeding apparatus of container-forming machines comprising a baseboard, a pair of spaced parallel ledges upon said baseboard, a U-shaped bracket pivotally supported between said ledges, means yieldably urging the side bars of said bracket into a forwardly directed position wherein they form an acute angle with said baseboard, and a roller pivotally supported between the free ends of the said bars.

References Cited
UNITED STATES PATENTS

| 970,092 | 9/1910 | McDonald | 72—346 |
| 1,652,903 | 12/1927 | Martin | 113—114 |
| 2,211,009 | 8/1940 | Grotnes | 72—346 |
| 2,562,247 | 7/1951 | Van Schie | 113—113 |

RICHARD J. HERBST, *Primary Examiner.*